(12) United States Patent
Katsunuma et al.

(10) Patent No.: US 8,176,196 B2
(45) Date of Patent: May 8, 2012

(54) STREAM DATA PROCESSING METHOD AND APPARATUS

(75) Inventors: Satoshi Katsunuma, Kokubunji (JP);
Tsuneyuki Imaki, Kawasaki (JP);
Shinji Fujiwara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 259 days.

(21) Appl. No.: 12/709,412

(22) Filed: Feb. 19, 2010

(65) Prior Publication Data

US 2011/0040827 A1 Feb. 17, 2011

(30) Foreign Application Priority Data

Aug. 12, 2009 (JP) ................................. 2009-187137

(51) Int. Cl.
*G06F 15/16* (2006.01)
(52) U.S. Cl. ......... 709/231; 707/752; 382/303; 382/304
(58) Field of Classification Search .................. 709/203, 709/231; 707/752, 764, 769; 715/219; 382/303, 382/304
See application file for complete search history.

(56) References Cited

U.S. PATENT DOCUMENTS

| | | | |
|---|---|---|---|
| 2004/0148420 A1* | 7/2004 | Hinshaw et al. | 709/231 |
| 2005/0141503 A1* | 6/2005 | Welfeld | 370/392 |
| 2007/0288635 A1* | 12/2007 | Gu et al. | 709/226 |
| 2008/0168179 A1* | 7/2008 | Gu et al. | 709/231 |
| 2009/0031175 A1* | 1/2009 | Aggarwal et al. | 714/47 |
| 2011/0016379 A1* | 1/2011 | McColl et al. | 715/219 |

OTHER PUBLICATIONS

Rajeev Motwani et al.; Query Processing, Resource Management, and Approximation n a Data Stream Management System, Proceeding of the 2003 CIDR Conference, http://ww-db.stanford.edu/strea.

Theodore Johnson et al.; Query-Aware Partitioning for Monitoring Massive Network Data Streams, SIGMOND'08, Jun. 9-12, 2008, Johnson@research.att.com.

Mehul A. Shah et al.; Flux: An Adaptive Partitioning Operation for continuous Query Systems, IEEE Computer Society, Proceedings of the 19th International Conference on Data Engineering (icde'03), pp. 25-35.

Milena Ivanova et al.; Customizable Parallel Execution of Scientific Stream Queries, Proceedings of the 31st VLDB Conference, Trondheim, Norway, 2005, pp. 157-167.

* cited by examiner

*Primary Examiner* — Frantz Jean
(74) *Attorney, Agent, or Firm* — Antonelli, Terry, Stout & Kraus, LLP.

(57) ABSTRACT

A user specifies a group by a user-defined query. An input order is assured among data of a same group. By outputting data belonging to a same group from the same node, an order inputted for a necessary portion is assured. By outputting data belonging to different groups from another node, processing in plural nodes is achieved to avoid reduction in performance.

14 Claims, 30 Drawing Sheets

FIG. 3

```
STREAM STOCK_ORDER
        (BRAND, EXCHANGE, NUMBER_OF_ORDERS,
         ACCOUNT, BUSINESS_CATEGORY);
    order partition by BRAND QUERY q1
istream (
    SELECT BRAND, EXCHANGE, sum(NUMBER_OF_ORDERS)
      FROM STOCK_ORDER [range 1 minute]
      GROUP BY BRAND, EXCHANGE);
```
301

FIG. 4

400 — READ USER-DEFINED QUERY AND CALCULATE OPERATOR EXECUTION PARTITION KEY

401 — CALCULATE OUTPUT PROCESSING PARTITION KEY FROM OPERATOR EXECUTION PARTITION KEY AND OrderPartitionBy KEY 402 — GENERATE OPERATOR TREE, OUTPUT PROCESSING NODE REFERENCE TABLE, AND OPERATOR EXECUTION NODE REFERENCE TABLE FROM PARTITION KEY OF OPERATOR EXECUTION AND OUTPUT PROCESSING, AND DISTRIBUTE THEM TO NODES FIG. 15
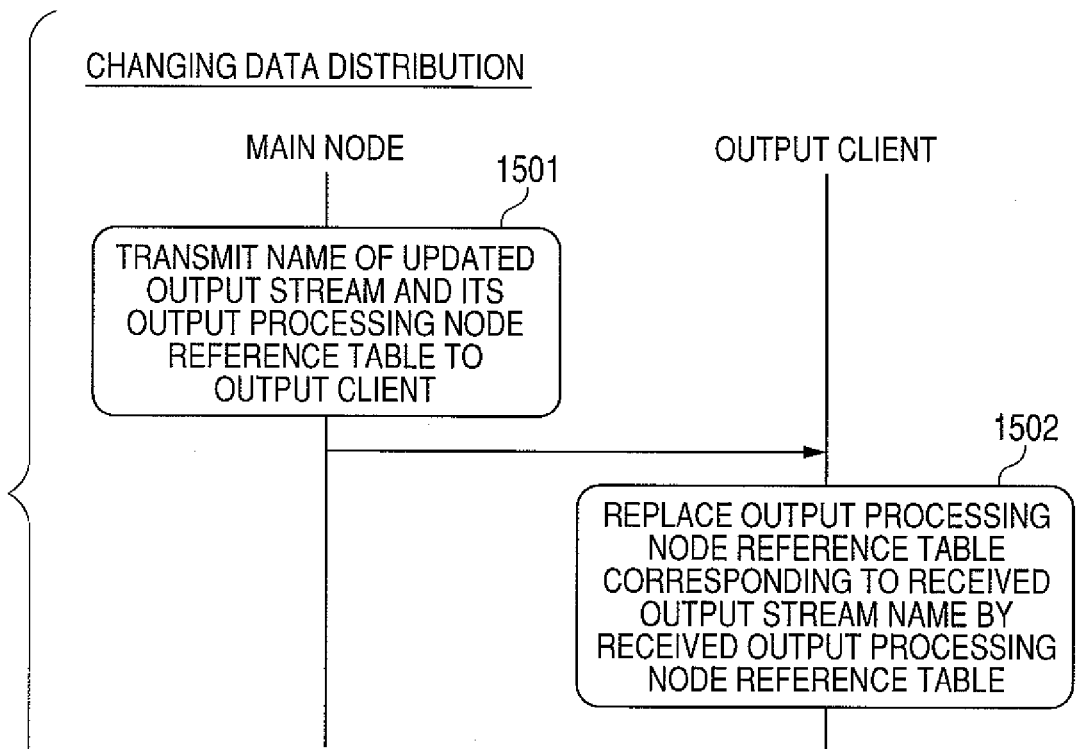
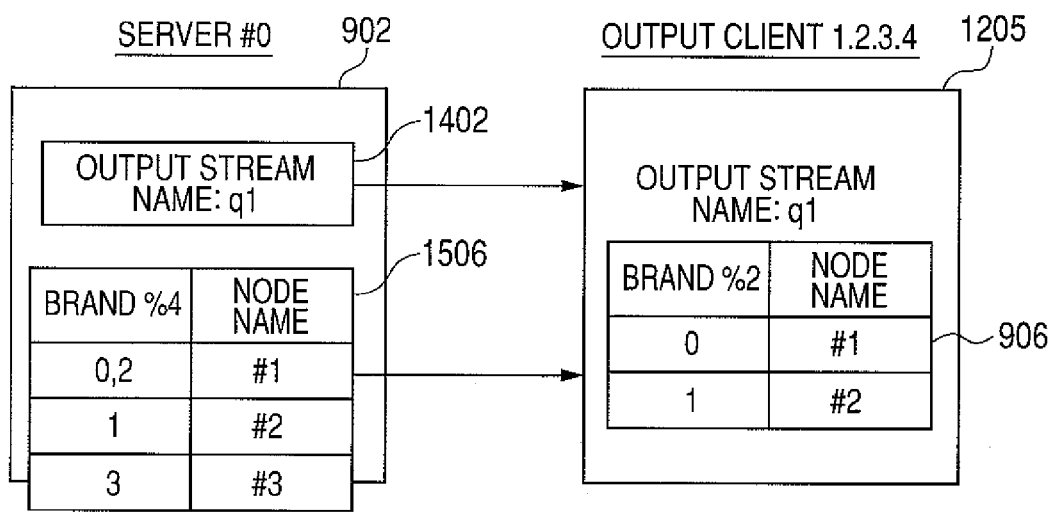

FIG. 21

```
STREAM STOCK_ORDER
        (BRAND, EXCHANGE, NUMBER_OF_ORDERS,
         ACCOUNT, BUSINESS_CATEGORY);
    order partition by BRAND
         limit 1 second QUERY q1
istream ( SELECT BRAND, EXCHANGE, sum(NUMBER_OF_ORDERS)
        FROM STOCK_ORDER [range 1 minute]
        GROUP BY BRAND, EXCHANGE);
```

2101

FIG. 27
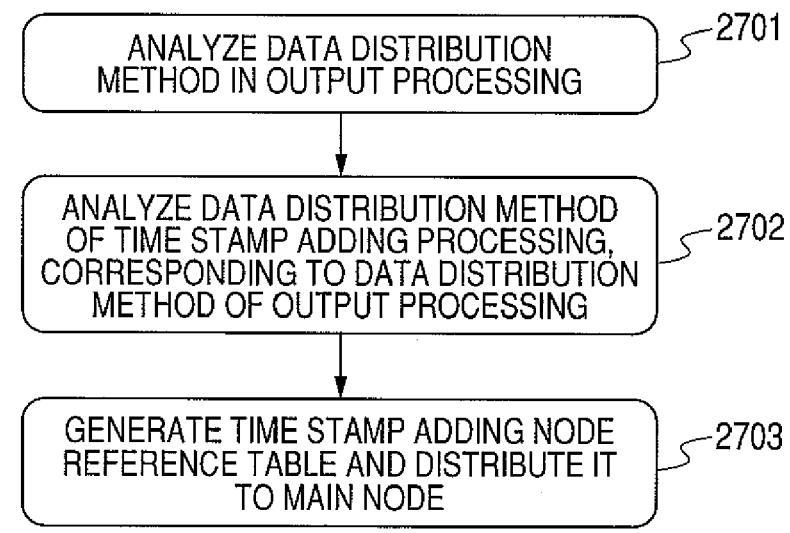
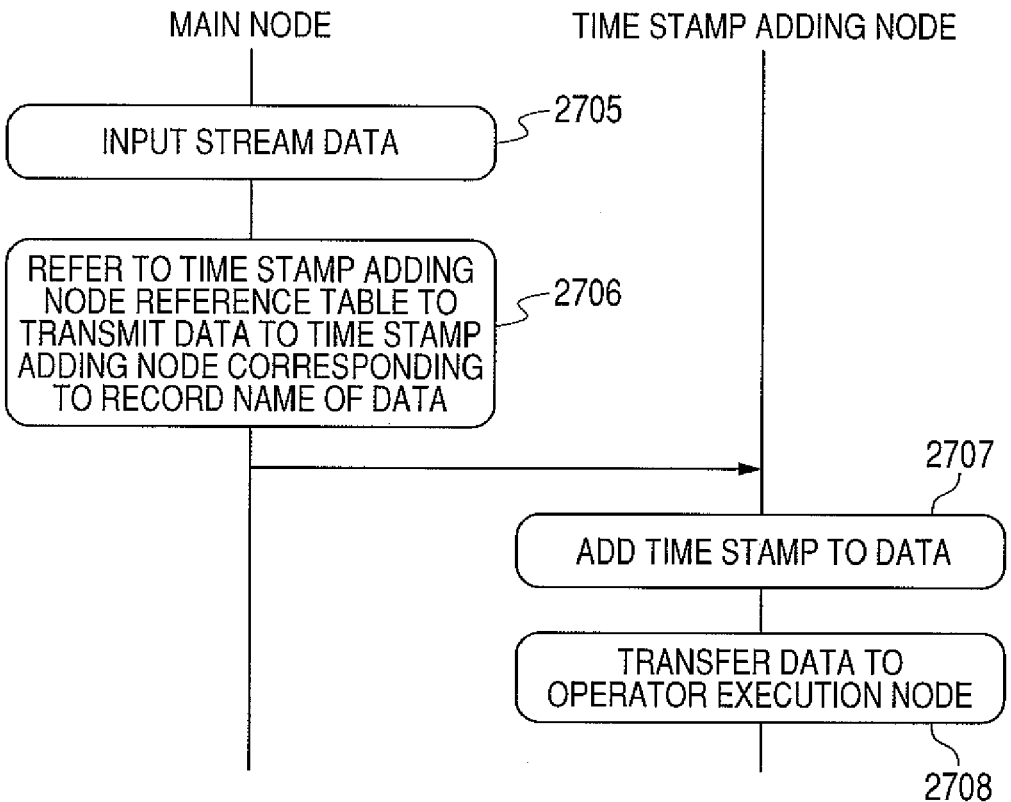

STREAM DATA PROCESSING METHOD AND APPARATUS

CLAIM OF PRIORITY

The present application claims priority from Japanese patent application JP 2009-187137 filed on Aug. 12, 2009, the content of which is hereby incorporated by reference into this application.

FIELD OF THE INVENTION

The present invention relates to a technique for performing operator execution and output processing in plural nodes for each data in a stream data processing system.

BACKGROUND OF THE INVENTION

There is an increasing demand for a data processing system that processes in real time a large amount of data arriving from time to time. Examples are stock automatic trade, car probe, Web access monitoring, manufacturing monitoring, and the like.

Conventionally, a data base management system (hereinafter referred to as DBMS) has been positioned at the center of data management of an enterprise information system. DBMS stores data to be processed in storage, and achieves highly reliable processing such as transaction processing for the stored data. However, DBMS has difficulty in satisfying the above-described real-time capability because it performs retrieval processing for all data each time new data arrives. For example, in the case of financial application supporting stock transactions, one of the most important problems of the system is how quickly the system can respond to a change in stock price. However, a business chance may be lost because data retrieval processing cannot catch up with the speed of stock price change.

A stream data processing system is proposed as such a data processing system suitable for real time data processing. For example, a stream data processing system "STREAM" is disclosed in R. Motwani, J. Windom, A. Arasu, B. Babcock, S. Babu, M. Datar, G. Manku, C. Olston, J. Rosenstein and R. Varma: "Query Processing, Resource Management, and Approximation in a Data Stream Management System", In Proc. of the 2003 Conf. on Innovative Data Systems Research (CIDR), January 2003. The stream data processing system, unlike conventional DMBS, registers a query in the system and continuously executes the query upon the arrival of data. Since the query executed can be grasped in advance, high speed processing can be performed by, upon the arrival of new data, processing only differences from previous processing results. Therefore, by the stream data processing, data occurring at a high rate in stock transactions and the like can be analyzed in real time to monitor and utilize the occurrence of events useful for business.

To quickly process a large amount of data, distributed processing by plural computers (nodes) is demanded in the stream data processing. In the distributed processing, a method (hereinafter referred to as a pipeline parallelism method) that processes data in a different node for each of operators constituting a query, and a method (hereinafter referred to as a data parallelism method) that processes data in plural nodes for each data for a same operator are known. Particularly, the data parallelism method can significantly increase throughput because communication overhead does not increase so noticeably with an increase in the number of nodes, in comparison with the pipeline parallelism method.

In the data parallelism method, a method for allocating data to each node is calculated from a method for processing each operator. Languages for stream data processing descriptions are often written in languages similar to SQL (Structured Query Language) widely used in DBMS such as CQL (Continuous Query Language) disclosed in A. Arasu, S. Babu and J. Widom: "The CQL continuous query language: semantic foundations and query execution", The VLDB Journal, Volume 15, Issue 2, pp. 121-142 (June 2006). A data partitioning method can be calculated by a method conforming to RDB. For example, like SQL, CQL has Join and Aggregation operators, by which how to partition data is determined by conditions of join and the unit of aggregation, respectively, like RDB. The data parallelism method is disclosed in: US Patent US2007/0288635; US Patent US2008/0168179; T. Johnson, M. S. Muthukrishnan, V. Shkapenyuk, O. Spatscheck: "Query-aware partitioning for monitoring massive network data streams", SIGMOD, 2008; M. A. Shah, J. M. Hellerstein, S. Chandrasekaran, M. J. Franklin: "Flux: an adaptive partitioning operator for continuous query systems", ICDE, 2003; and M. Ivanova, T. Risch: "Customizable parallel execution of scientific stream queries", VLDB, 2005.

SUMMARY OF THE INVENTION

As described previously, in stream data processing, a query is first registered, and then executed upon the arrival of data. For data arriving in the system, results are outputted according to its arrival order without being influenced by intermediate processing. Therefore, in the data parallelism method, to keep an arrival order, data arriving in the system is first added with a time stamp, and then is subjected to operator execution in plural nodes. During data output, the data is sorted according to time stamp values.

Sorting during output is performed for all data in one node. Therefore, even when the number of nodes for operator execution is increased, the speed is controlled by processing during output, and throughput cannot be increased beyond a certain level. Moreover, processing delay of one computer, delays processing results in other computers, and increases latency.

In actual applications, an input order must often be assured among some data. For such applications, to quickly perform execution while keeping an input order in necessary portions, plural queries are defined, and output data of the queries is manually merged as required. However, this method is low in convenience because if the user does not grasp the output of the queries, performance and the consistency of data input cannot be maintained.

An object of the present invention is to provide a stream data processing method and apparatus that quickly performs stream data processing while maintaining the order of data to be assured of order.

To address the above object, the present invention is a stream data processing method and apparatus that process inputted data by plural nodes. The stream data processing method and apparatus registers a query in a first node, subjects data added with time stamps to operator execution in a second node set, sorts the data having been subjected to the operator execution according to the time stamps to output the sorted data in a third node set, in the first node, extracts a set of first value expressions indicating a group that assures an input order by data of the same group from the registered query, calculates a set of second value expressions indicating a method for partitioning operator execution for each data in plural second nodes, analyzes a method for distributing data to plural third nodes, and distributes data having been processed in a same second node so as to be processed in a same third node.

Specifically, in the present invention, a user specifies a group (hereinafter referred to an input assurance group) in query definition. An input order is assured among data of a same input assurance group. By outputting data belonging to a same input assurance group in a same node, an order inputted for a necessary portion is assured. Moreover, by outputting data belonging to a different input assurance group in other nodes, processing in plural nodes is realized and reduction in performance is avoided. Since an output processing method of the query is automatically analyzed from a user-defined input assurance group, it is easy to realize the method.

Preferred embodiments of the present invention add a module for parallelizing query output processing (hereinafter referred to as a query parallelism unit) to a stream data processing server. When a query for which an input assurance group is specified has been registered in the server, the query parallelism unit operates. After calculating a method for processing query operators by the data parallelism method, the query parallelism unit reads an input assurance group and performs calculation in combination with the calculated operator execution method. It analyzes a method for distributing data to plural nodes in query output processing. Moreover, from the distribution method of the output processing, it analyzes a method for distributing the data to plural nodes in operator execution.

The preferred embodiments add a module for managing output processing nodes (hereinafter referred to as an output processing node management unit) to a stream data processing engine. The query parallelism unit processes operators in plural nodes according to the distribution method of operator execution during query execution, and receives a data output request from a client in the output processing node management unit. It retrieves a data output processing node from the distribution method of output processing, and sends information of the client and output data to the output processing node. Finally, when the output processing node has terminated operator execution for corresponding data, it transfers the processed data to the client.

The present invention assures an input order as required, and performs stream data processing with high throughput and low latency.

BRIEF DESCRIPTION OF THE DRAWINGS

FIG. 3 is a drawing showing an example of query definition in a first embodiment;

FIG. 4 is a flowchart of query registration in a first embodiment;

FIG. 15 is a drawing showing output processing node change processing during execution in a first embodiment;

FIG. 21 is a drawing showing an example of query definition in a second embodiment;

FIG. 27 is a drawing a flowchart in a third embodiment;

DETAILED DESCRIPTION OF THE PREFERRED EMBODIMENTS

Hereinafter, different embodiments of the present invention will be described with reference to the drawings.

Figure 1:
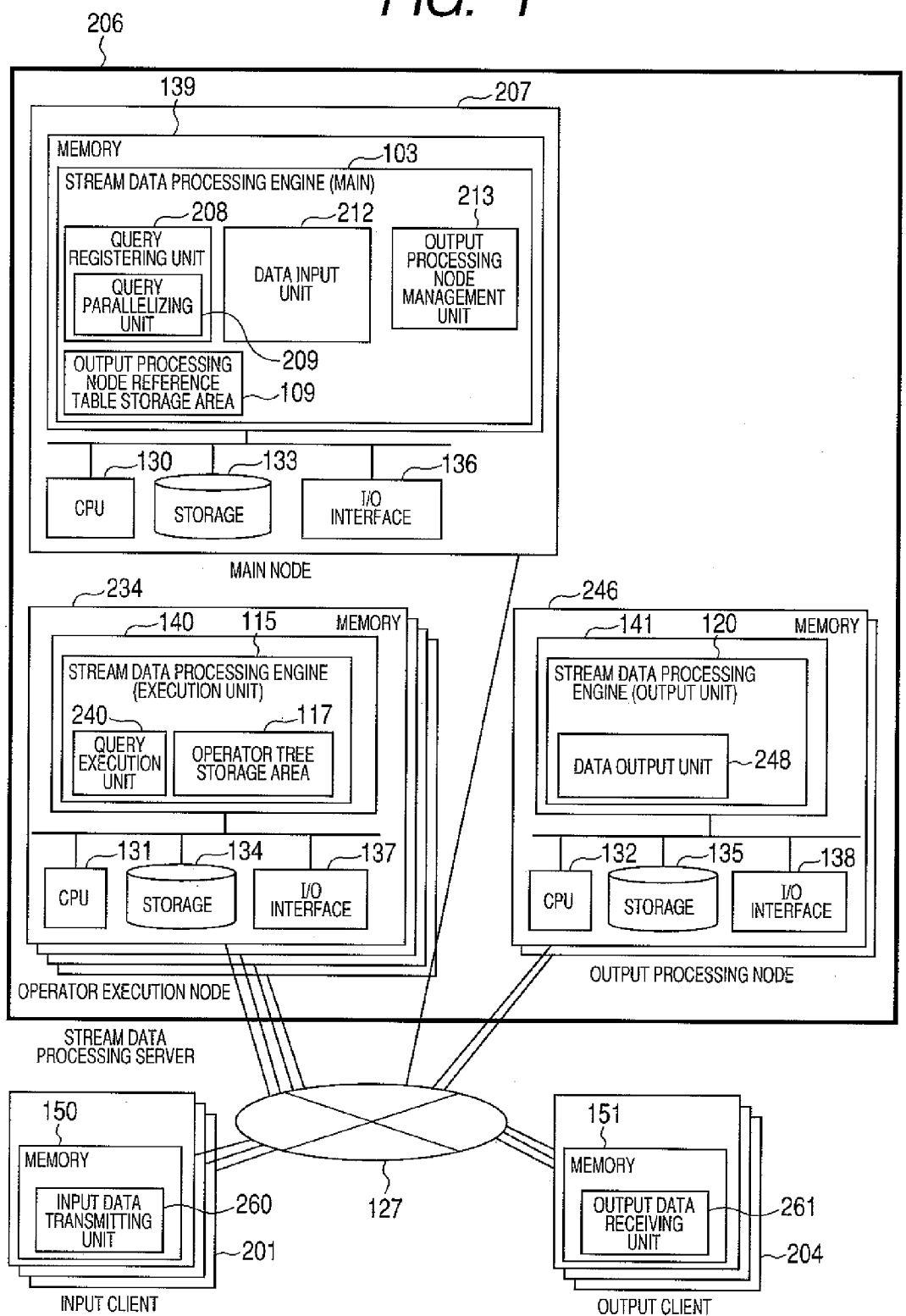
FIG. 1 is a block diagram showing an example of a computer system used in each embodiment.

FIG. 1 is a drawing showing a configuration of a computer system to which the embodiments are applied. An input client node 201 including an input data transmitting unit 260 on memory 150, and an output client 204 including an output data receiving unit 261 on memory 151 are connected to a stream data processing server 206 in which a stream data processing system operates, through a network 127. The network 127 may be Ethernet (trademark), a local area network (LAN) connected through optical fibers or the like, or a wide area network (WAN) including the Internet slower than LAN. The client computers 201 and 204 may be any computer systems such as personal computers (PC) and blade type computer systems.

The stream data processing server includes a main node 207, plural operator execution nodes 234, and plural output processing nodes 246, and the nodes are connected through the external network 127 or internal network. The nodes 207, 234, and 246 are computers in which I/O interfaces 136 to 138 each constituting an interface unit, central processing units (CPU) 130 to 132 each constituting a processing unit, and memories 139 to 141 each serving as a storage unit are connected through buses. The computers may be any computer systems such as blade type computer systems and PC servers, or data processing apparatuses.

The nodes 207, 234, and 246 access the client computers 201 and 204 through the I/O interfaces 136 to 138, respectively. When the nodes 207, 234, and 246 store stream data processing results, intermediate results of processing, and setting data necessary for system operation in nonvolatile storage, they can use storage devices 133 to 135 as storage units, respectively. The storage devices 133 to 135 are directly connected through the I/O interface 136 to 138, respectively, or connected through the network from the I/O interface 136 to 138, respectively. Stream data processing engines (software) 103, 115, and 120 performing stream data processing are mapped onto their respective memories 139 to 141 of the nodes 207, 234, and 246.

This specification, in some cases, refers to the main node 207, the plural operator execution nodes 234, and the plural output processing nodes 246 as a first node, second node, and third node, or a first node set, second node set, and third node set, respectively. As described above, the server 206 has a multi-computer configuration including plural nodes. However, the server may be configured so that the plural stream data processing engines 103, 115, and 120 operate in a multiprocessor computer including plural CPUs in one node. Moreover, the server may be configured with a combination of a multi-computer and multiprocessor.

The following describes the respective modules of the stream data processing engines 103, 115, and 120. The stream data processing engine 103 includes a query registering unit 208 containing a query parallelism unit 209, an output processing node reference table storage area 109, an operator execution node reference table storage area 110, a data input unit 212, and an output processing node management unit 213. Usually, the stream data processing engine 103 of the first node 207 of the stream processing server 206 adds a time stamp to inputted data. However, for the sake of simplicity, the description of the processing is omitted. On the other hand, the stream data processing engine 115 includes a query execution unit 240 and an operator tree storage area 117. The stream data processing engine 120 includes a data output unit 248. The operation of the modules will be described later.

First Embodiment

Hereinafter, a first embodiment will be described with reference to the drawings.

Figure 2:
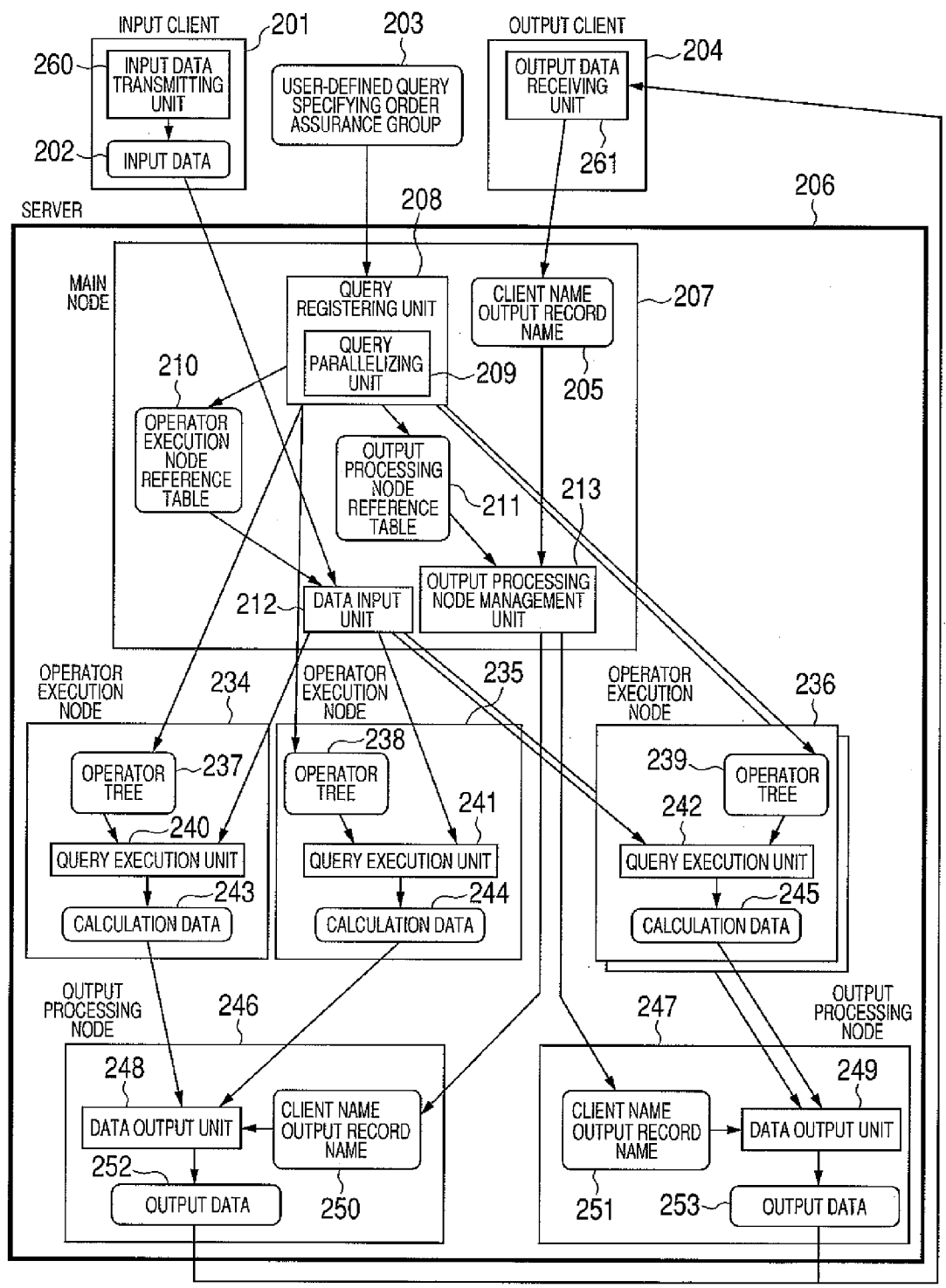
FIG. 2 is an operation diagram of a computer system of a first embodiment.

FIG. 2 is a drawing for explaining the operation of the first embodiment. Some applications are not always demanded to assure an input order for data processed by a query. In the first embodiment, in such a case, by assuring an input order only for data of the same group as a group specified in advance, an increase in throughput and reduction in latency are achieved.

The main node 207 receives a query 203 defined by a user. The user-defined query 203 includes a description of a data processing method and the specification of an input assurance group to which data to be processed belongs. Data belonging to a same input assurance group is assured an input order. In the main node 207, the query registering unit 208 interprets each operator of the query, and the query parallelism unit 209 of the query registering unit 208 uses an order assurance group and a method for parallelizing data of the query to analyze a data distribution method for performing operator execution and output processing in plural nodes. By the obtained data distribution method, the query parallelism unit 209 generates operator trees 237 to 239, an operator execution node reference table 210, and an output processing node reference table 211. The operator trees 237 to 239 describe operators processed in the operator execution nodes 234 to 236, respectively. The output processing node reference table 211 is a table by which, with the record name of data as index, a node name to output the data is referred to. The operator execution node reference table 210 is a table by which, with the record name of data as index, a node name to subject the data to operator execution is referred to. The query registering unit 208 stores the operator trees 237 to 239 in operator tree storage areas of the operator execution nodes 234 to 236, respectively, and stores the output processing node reference table 211 in the output processing node reference table storage area of the main node 207. Furthermore, it stores the operator execution node reference table 210 in the operator execution node reference table storage area of the main node 207.

The execution of the registered query is started by transferring input data 202 from the input data transmitting unit 260 of the input client 201 to the data input unit 212 of the main node 207. The data input unit 212 adds a time stamp to the input data 202, and distributes the data to the operator execution nodes 234 to 236 according to the operator execution node reference table 210. The operator execution nodes 234 to 236 receive the data in the query execution units 240 to 242, respectively, and process the data by operators specified in the operator trees 237 to 239. By the operator execution, calculation data 243 and 244 generated in the operator execution nodes 234 and 235, respectively, are transferred to the output processing node 246, and calculation data 245 generated in the operator execution node 236 is transferred to an output processing node 247.

The calculation data 243 to 245 generated in the operator execution nodes 234 to 236 is not directly transferred to the output processing nodes, depending on operator trees. Depending on the operator tree 237, the calculation data 243 is transferred to the operator execution nodes 235 and 236, and is subjected to operator execution in the query execution units 241 and 242. Then, calculation data generated by the operator execution is transferred to the output processing nodes 246 and 247. Likewise, the calculation data 244 and 245 are also transferred to the operator execution nodes 234 to 236.

The calculation data 243 and 244, and 245 finally received in the output processing nodes 246 and 247 are sorted according to time stamps added to the calculation data to generate output data 252 and 253, respectively.

On the other hand, the output client 204 to acquire the output data 252 and 253 transfers a record name (e.g., in the case of query 301, as an brand name, A Electric Company, B Bank, H Electric Company, etc.) of the output data and the name 205 of the output client to the main node 207. The output processing node management unit 213 of the main node 207 searches the output processing node reference table 211 generated at query registration for the name of a node that outputs data corresponding to the record name. It transfers the names of clients as output destinations and the output record names 250 and 251 to the detected output processing nodes 246 and 247, respectively. The output processing nodes 246 and 247 perform matching between the record names of their respective output data 252 and 253 and the output record names 250 and 251, and if they agree, transfer their respective output data 252 and 253 to the output client 204.

Figure 18:
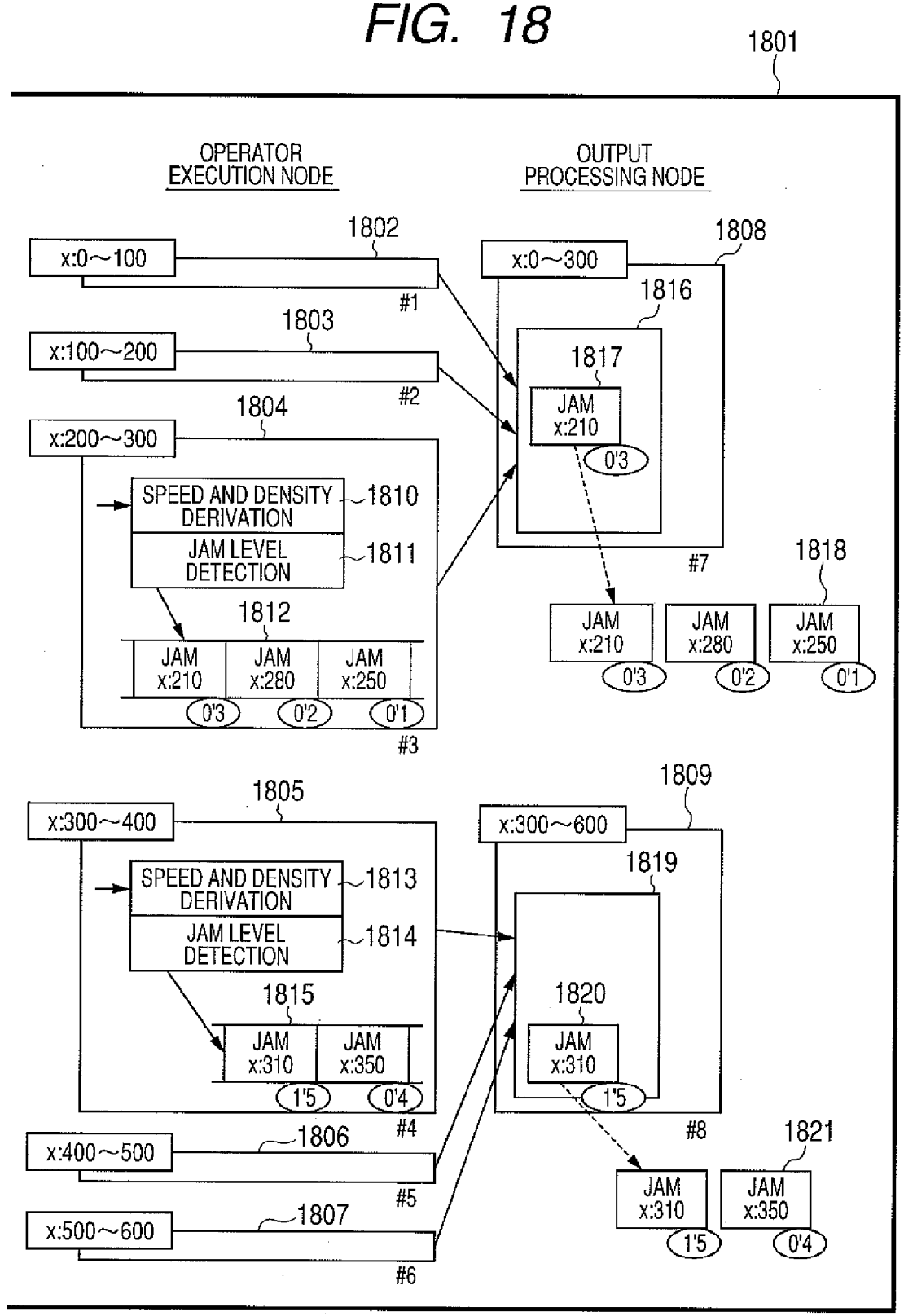
FIG. 18 is a drawing an operation example of query execution of vehicle jam detection query processing in a first embodiment.

In the first embodiment, throughput is increased when output processing node processing in existing data parallelism methods causes a bottleneck. For example, as shown in FIG. 18, when processing is performed in six operator execution nodes and two output processing nodes, if a processible input rate in one output processing node is T (tuple/second), in the case of existing data parallelism methods, a processible input rate in the whole is T (tuple/second), while 2 T is in the first embodiment (when a processible input rate of one processing node is T/3 (tuple/second) or more).

The operation of the first embodiment will be described in detail.

The following describes a method for defining a query by a user. FIG. 3 shows an example of a query defined by a user. In this embodiment, a set of value expressions that indicate an order assurance group is specified for the query. The specification may be described in the query or given through a setting file, or by other methods. In FIG. 3, in a stream definition, a value expression, item, is specified using a syntax Order Partition By added newly to a stream data processing description language (CQL). Value expressions may be specified in a query definition and other locations, in addition to a stream definition.

The query 301 defines a stream, stock_order, which includes brand, exchange, the number_of_orders, account, and business_category as columns. The stream stock_order distributes information about stock transaction, and a query q1 inputs the stream stock_order and always outputs the total number_of_orders for the last one minute for each brand and each exchange.

Although the user defining the query 301 must obtain aggregation results according to the order of transactions for a same brand, it is assumed that the order of transactions is not required for different brands. In this case, in defining the input stream stock_order, the user, by using the syntax Order Partition By to specify the column brand of the stream, tells the system that an input order does not need to be assured for different brands.

The following describes the registration operation of a query defined by a user. FIG. 4 is a flowchart of query registration in the main node. First, the main node reads a user-defined query and calculates a set of value expressions (hereinafter referred to as an operator execution partition key) indicating a method for processing all operators in parallel by partitioning data into plural nodes. A value expression is an arithmetic expression including columns of a stream as terms, and a value expression described later is also the same (400).

The main node analyzes a data distribution method in operator execution and output processing from the calculated operator execution partition key and a set of value expressions (hereinafter referred to as an OrderPartitionBy key) specified in the Order Partition By syntax. The distribution method achieves high-throughput output processing by satisfying (1) distributing data to plural nodes in the output processing and (2) always subjecting data subjected to operator execution in a same node to output processing in the same node. If throughput demanded from applications is satisfied, data subjected to operator execution in a same node may be subjected to output processing in different nodes.

The main node calculates a set of value expressions (hereinafter referred to as an output processing partition key) indicating a method for partitioning data into plural nodes for parallel processing during output processing from the operator execution partition key and the OrderPartitionBy key (401). From the calculated operator execution key and the output processing partition key, it analyzes a method for distributing data to the nodes in the respective processings. The data distribution method may also be a method that calculates no output processing partition key, such as a method based on numerical analysis. The main node generates operator trees, an operator execution node reference table, and an output processing node reference table, and distributes them to the nodes (402).

Figure 5:
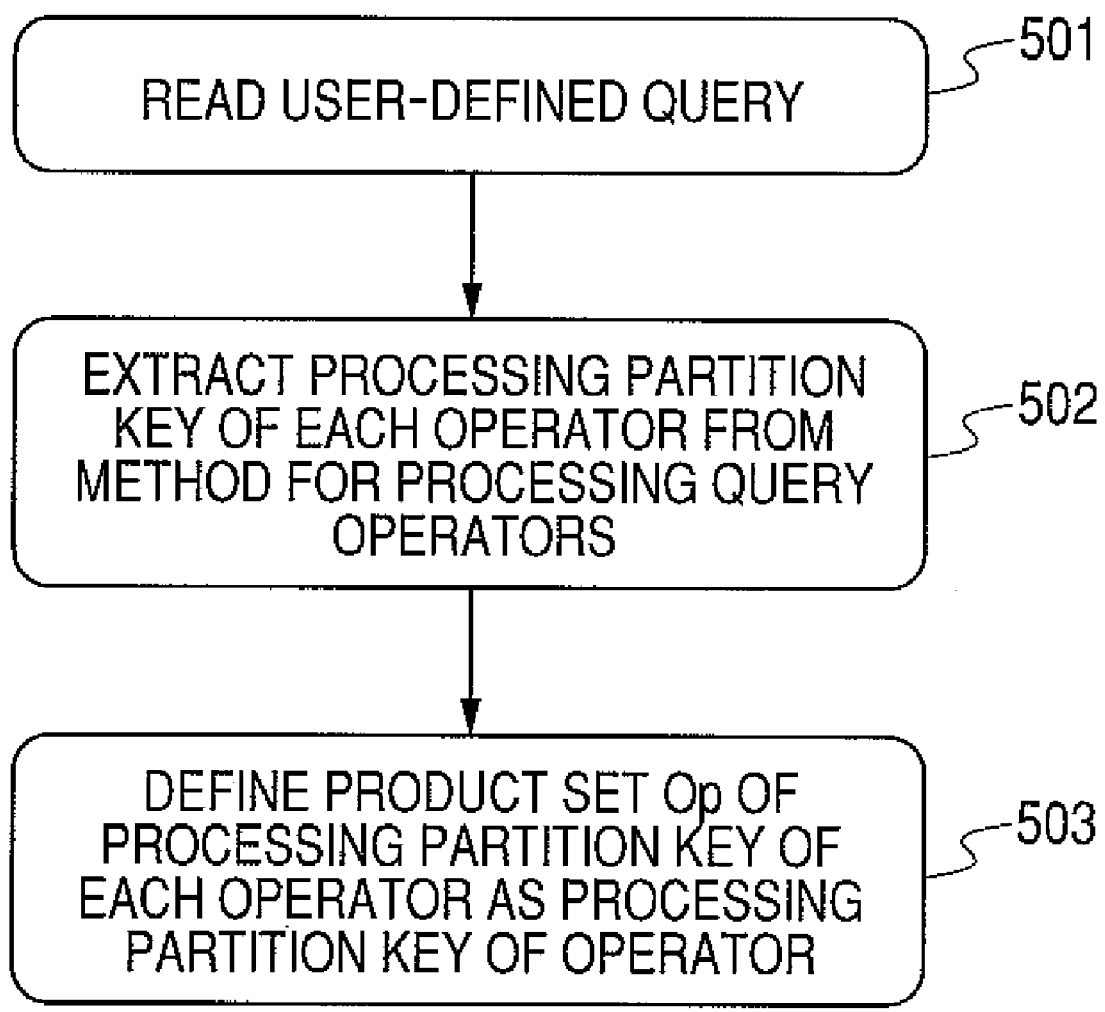
FIG. 5 is a drawing showing a flowchart of the calculation of an operator execution partition key in a first embodiment.

FIG. 5 is a flowchart detailing the operation of 400 in FIG. 4. The main node reads a user-defined query (501) and extracts a set of value expressions (hereinafter referred to as a processing partition key) indicating a method for allowing operators constituting the query to partition data into plural nodes for parallel processing (502). The method for extracting an execution partition key is extracted from a method for processing operators, according to existing RDB (Relational Data Base). For example, for an operator Join, a value expression specified in an equivalence condition of join is defined as an element of the execution partition key, and for an operator aggregation, a value expression specified in a Group By syntax is defined as an element of the execution partition key.

The main node defines the product set Op of execution partition keys of individual operators as an operator execution partition key (503). If Op is a null set, it reports that processing for operators of the query cannot be performed in parallel in each node, and terminates the registration operation. Or when reassigning calculation data among nodes is permitted in operator execution, the product set of some operators may be extracted as an operator execution partition key. The operator execution partition key may be obtained by a method different from the above-described method; for example, a key specified by the user who defines the query may be extracted.

Figure 6:
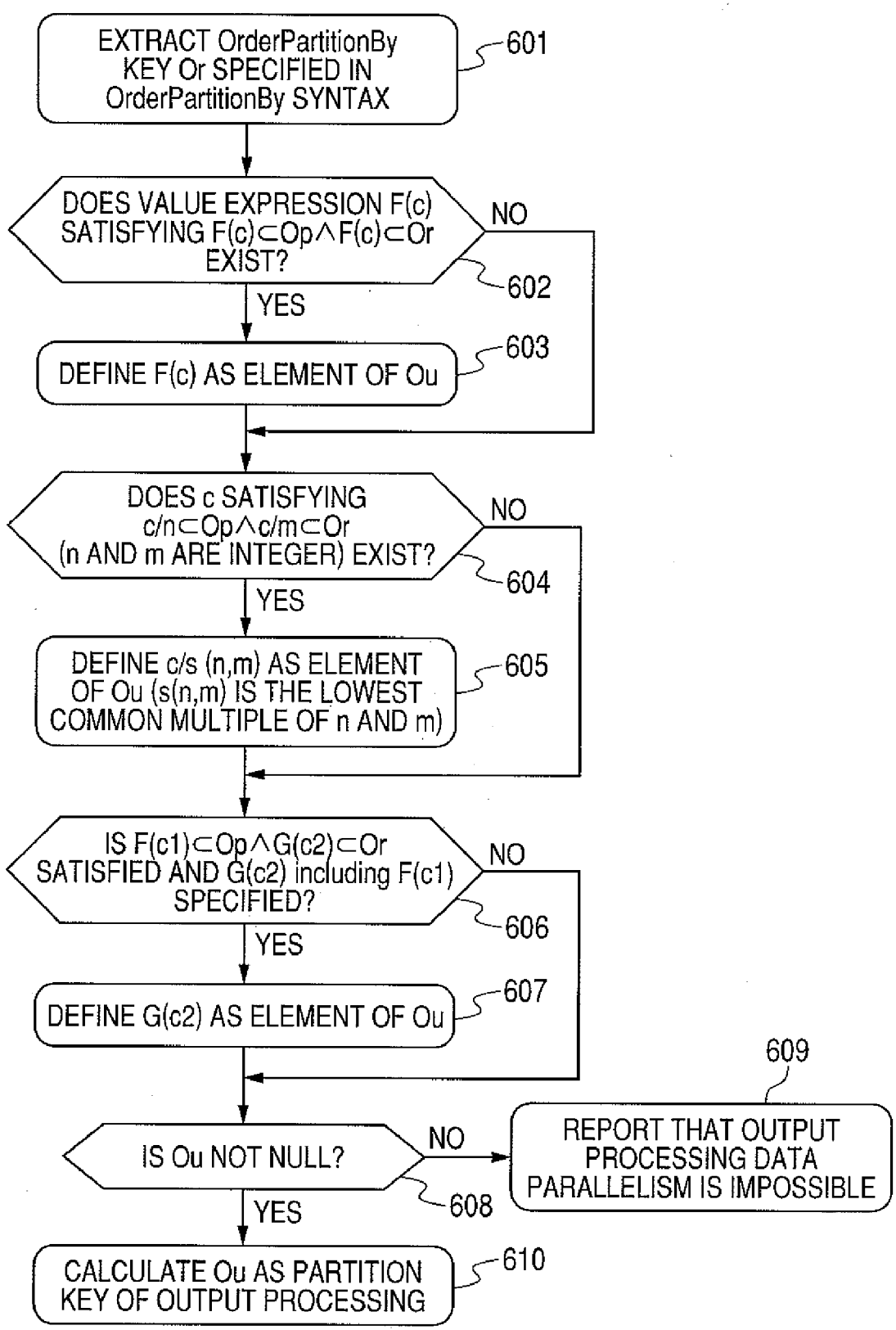
FIG. 6 is a flowchart of the calculation of an output processing partition key in a first embodiment.

FIG. 6 is a flowchart detailing the operation of 401 of FIG. 4. The main node extracts a set of value expressions (OrderPartitionBy key) Or that are specified in the Order Partition By syntax (601). It calculates an output processing partition key Ou from the operator execution partition key Op and OrderPartitionBy key Or. When $F(c)$ satisfying $F(c) \subset Op \wedge F(c) \subset Or$ ($F(c)$ is an arithmetic expression having any column c of the stream as a term) exists for Op and Or (602), the main node defines $F(c)$ as an element of Ou. When plural $F(c)$s satisfy the condition, it defines all $F(c)$s as elements (603). When c satisfying $c/n \subset Op \wedge c/m \subset Or$ (n and m are integers) exists (604), it defines $c/s(n,m)$ ($s(n,m)$ is the lowest common multiple of n and m) as an element of Ou. When plural cs satisfy the condition, it defines all $c/s(n,m)$ as elements (605).

Furthermore, when the relation of $G(c2)$ including $F(c1)$ ($F(c1)$ and $G(c2)$ are value expressions having any columns c1 and c2 of the stream as terms) is specified by the user, if $F(c1) \subset Op \wedge G(c2) \subset Or$ is satisfied, the main node defines $G(c2)$ as an element of Ou. $G(c2)$ including $F(c1)$ indicates that stream data with the same value expression $F(c1)$ always has the same value expression $G(c2)$. If plural conditions exist, it defines all $G(c2)$ as elements (606, 607). If Ou is not a null set (608), it calculates Ou as a partition key of output processing (610). If Ou is a null set, it reports that data parallelism of output processing is impossible, and terminates the registration operation (609). In the operation of 401, also by a method different from the above-described method such as statistical analysis, if it is shown that stream data with the same value expression F(c1) always has the same value expression G(c2), G(c2) may be defined as an element of Ou (F(c1) and G(c2) are value expressions having any columns c1 and c2 of the stream as terms, and satisfy F(c1) ⊂ Op ∧ G(c2) ⊂ Or).

Figure 7:
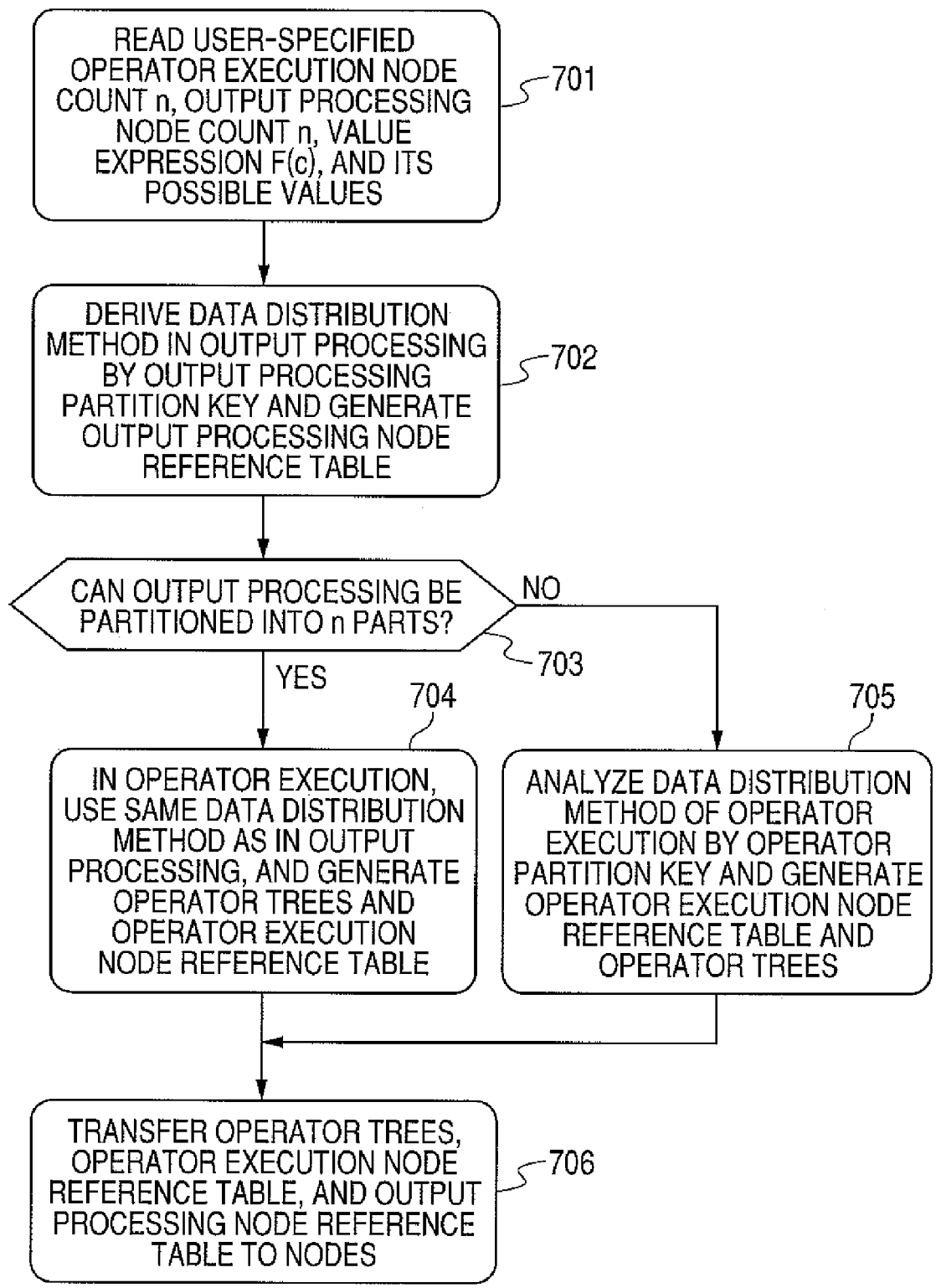
FIG. 7 is a flowchart of the generation of operator trees, an operator execution node reference table, and output processing node reference table.

FIG. 7 is a flowchart detailing the operation of 402 of FIG. 4. The main node reads user-specified operator execution node count n, output processing node count m, value expression F(c) (F(c) is an arithmetic expression having any column c of the stream as a term), and its possible values (or the number of values) (701). The operator execution node count and output processing node count may be acquired by a different method; for example, they may be acquired from system information such as OS. F(c) and its possible values may also be acquired by a different method; for example, they may be acquired from data by statistical analysis. The main node determines a method for distribution to the nodes in conjunction with the calculated operator execution and output processing partition key, and generates operator trees, an operator execution node reference table, and an output processing node reference table.

When the number of possible values of the value expression as an element of the output processing partition key is greater than the operator execution node count n, the main node determines a method for distributing the data to n output processing nodes, and generates the output processing node reference table. Any distribution method may be used. For example, the data is distributed by making partition to some areas according to the magnitude of the value expression or a dictionary order; the data is distributed according to a hash value determined from the value expression by a hash function such as mod (remainder operation); or the data is distributed with the deviation of the data in mind. Also in the operator execution, the main node uses the same data distribution method as that in the output processing to generate the operator execution node reference table. It generates n same operator trees (704). Thus, after subjecting the data to the operator execution, by distributing the data to continuously perform the output processing in the same node, high throughput is achieved by parallelizing the operator execution and the output processing, and low latency is obtained without causing inter-node communication between the operator execution and the output processing.

When the number of possible values of the value expression as an element of the output processing partition key is smaller than the operator execution node count n, the main node determines a method for distributing the data to a maximum of m output processing nodes, and generates the output processing node reference table (702). Any distribution method may be used. For example, the values may be partitioned to some areas for distribution, or the data may be distributed according to a hash value determined by a hash function. The main node analyzes a method for distributing the data to a maximum of n operator execution nodes in the operator execution by distributing data distributed to a same output processing node by the distribution method of the output processing to plural operator execution nodes in the operator execution. Specifically, it analyzes a method for distributing the data to plural operator execution nodes by making partition to plural areas by using the value expression as an element of the operator execution partition key, or by determining a hash value from the value expression to make partition by the hash value. Then, it generates the operator execution node reference table from the analysis result. It generates the same number of operator execution nodes as the operator execution node count (705). Since the operator execution generally requires higher calculation costs than the output processing, throughput is increased by having more processing nodes in the operator execution than in the output processing. However, as a result, communication occurs between the operator execution and the output processing, and latency increases. In applications that decrease latency in preference to increasing throughput, the operator execution may distribute data like the output processing, or other methods may be used.

Finally, the main node transfers the generated operator trees, output processing node reference table, and operator execution node reference table to the nodes (705).

Figure 8:
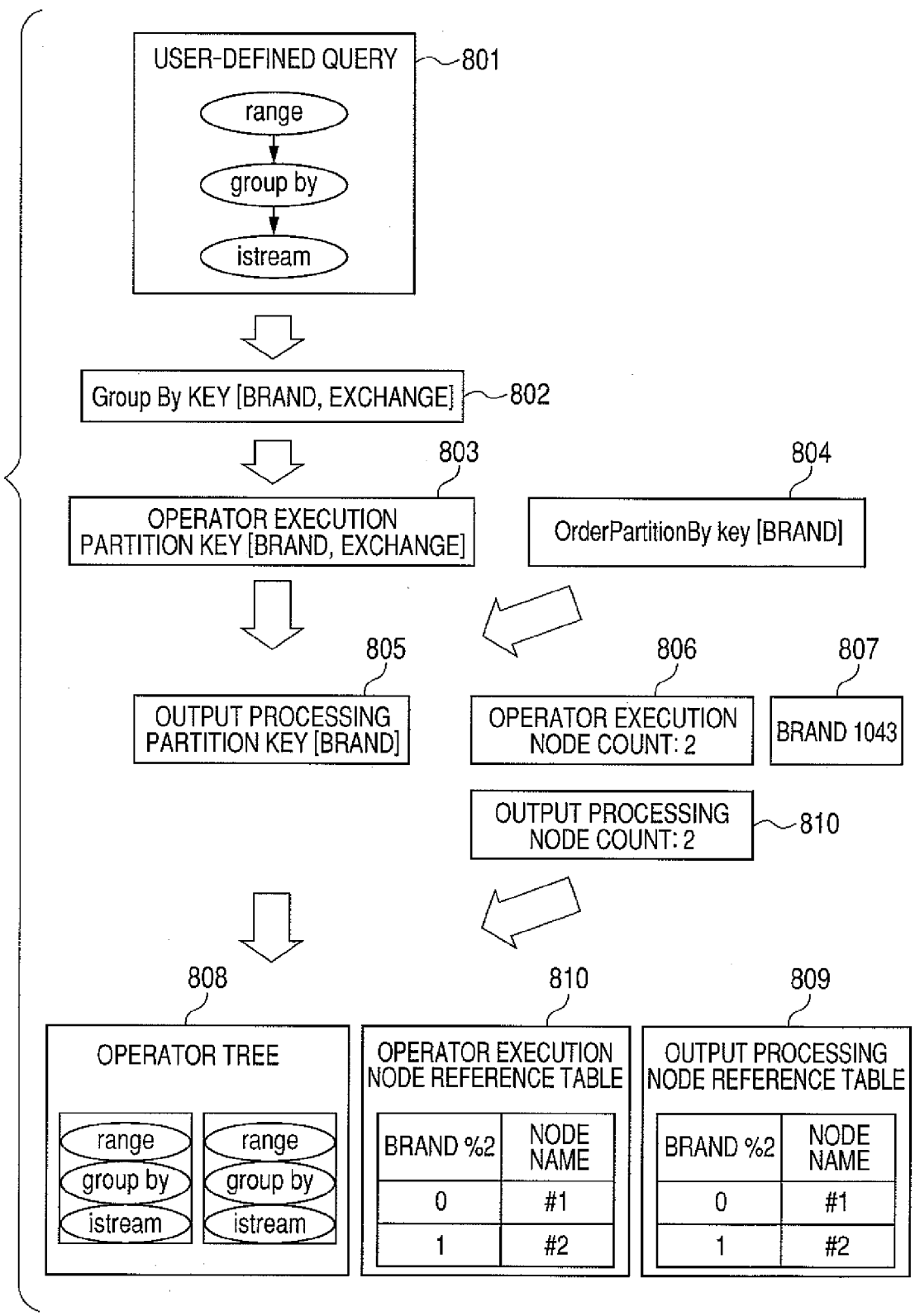
FIG. 8 is a drawing showing an example of query registration operation in a first embodiment.
Figure 9:
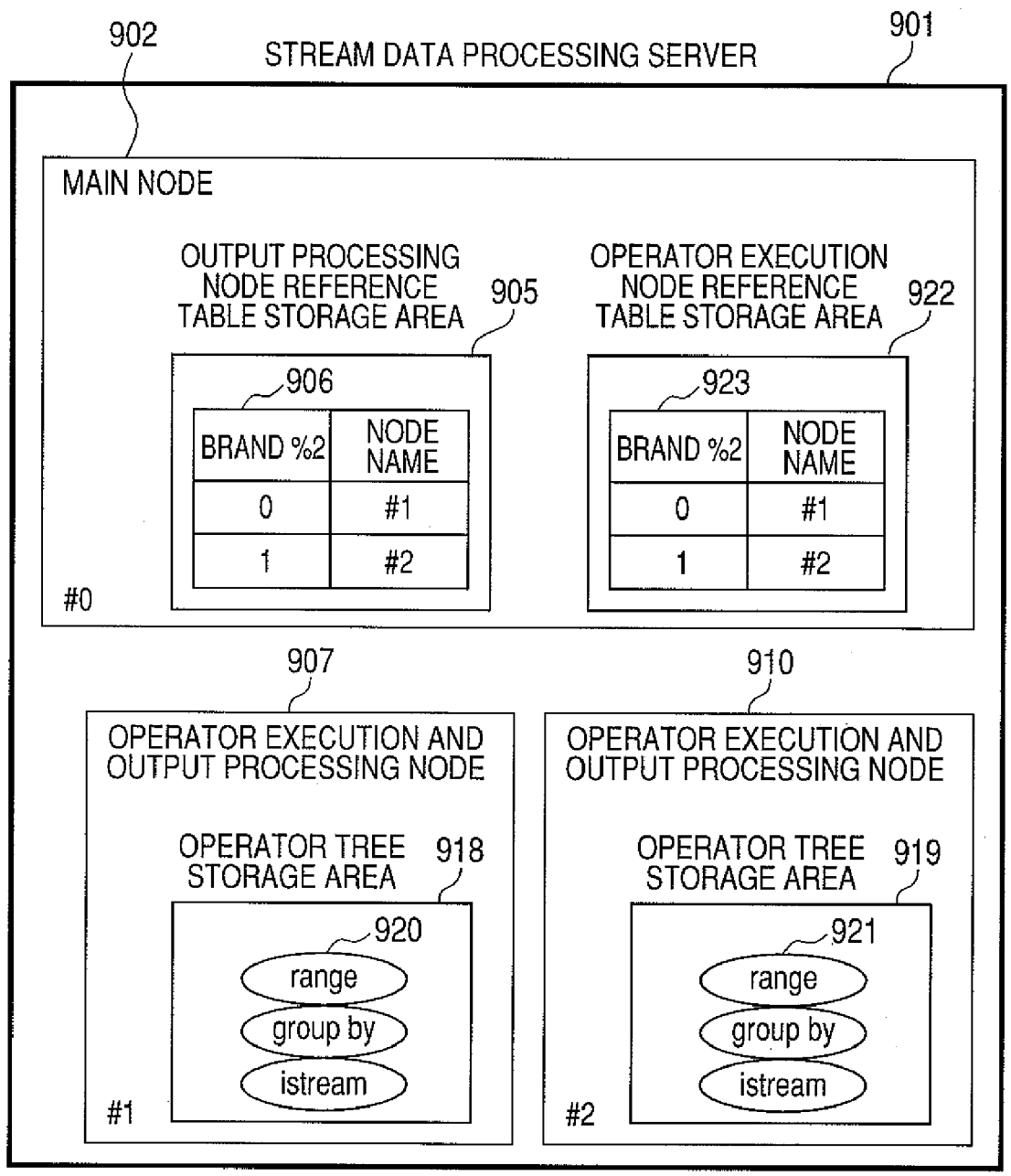
FIG. 9 is a drawing showing an example of distribution processing for operator trees, an operator execution node reference table, and an output processing node reference table in a first embodiment.

FIGS. 8 and 9 show the operation of query registration using the query 301 as an example. The query 301 includes operators range, group by, and istream (801). The operators range and istream allow all data to be processed in parallel, and therefore take any value expressions as elements of execution partition key. The operator group by allows parallel execution for data different in the column brand or exchange of the stream stock transaction by the unit of aggregation. Therefore, the execution partition key of the operator group by is {brand, exchange} (802) (operation of 502). Therefore, by taking the product set of execution partition keys of the operators, an operator execution partition key is calculated as {brand, exchange} (803) (operation of 503).

By the syntax Order Partition By, OrderPartitionBy key is extracted as {brand} (804) (operation of 601). Therefore, since the value expression brand containing the column brand exists as an element common to the operator execution partition key and the OrderPartitionBy key, output processing partition key is calculated as {brand} (805) (operation of 602 and 603).

The main node determines a distribution method of the output processing from the user-specified operator execution node count 2 (806), output processing node count 2 (810), and the number of possible values 1043 of "brand" as an element of the output processing partition key (operation of 701). Since the number of possible values 1043 of "brand" is greater than the operator execution node count, data is distributed to the two operator execution nodes. As a distribution method, a hash value obtained by a hash function (function that returns a remainder obtained by dividing a value with a character string expressed by a bit string by 2) is used. The main node distributes data having a hash value of 0 to node 1, and data having a hash value of 1 to node 2. It realizes the distribution method as an output processing node reference table 809 (operation of 702). Furthermore, since the output processing can be distributed to two (operator execution node count) nodes (operation of 703), the main node uses the same data distribution method of the operator execution as that of the output processing to generate an operator execution node reference table. It also generates two (operator execution node count) operator trees (808) (operation of 705).

The generated output processing node reference table 906 is stored in an output processing node reference table storage area 905 of main node #0 (902) of a stream data processing server 901, and the operator execution node reference table 923 is stored in an operator execution node reference table storage area 922. The operator trees 920 and 921 are stored in operator tree storage areas 918 and 919 of execution and output processing nodes #1 (907) and #2 (910), respectively (operation of 706).

Although the query 301 includes one query, a query of actual stream data processing generally includes a series of plural queries. In this embodiment, even when plural queries continue, an operator execution partition key can be calculated by the same method. In the query 301, the value expression including a common column of the stream exists in elements of the operator execution partition key and the OrderPartionBy key. However, even if a value expression containing a common column does not exist, output processing partition key can be calculated. The following describes the operation of output processing partition key calculation using a query 100 of FIG. 10 as an example.

Figure 10:
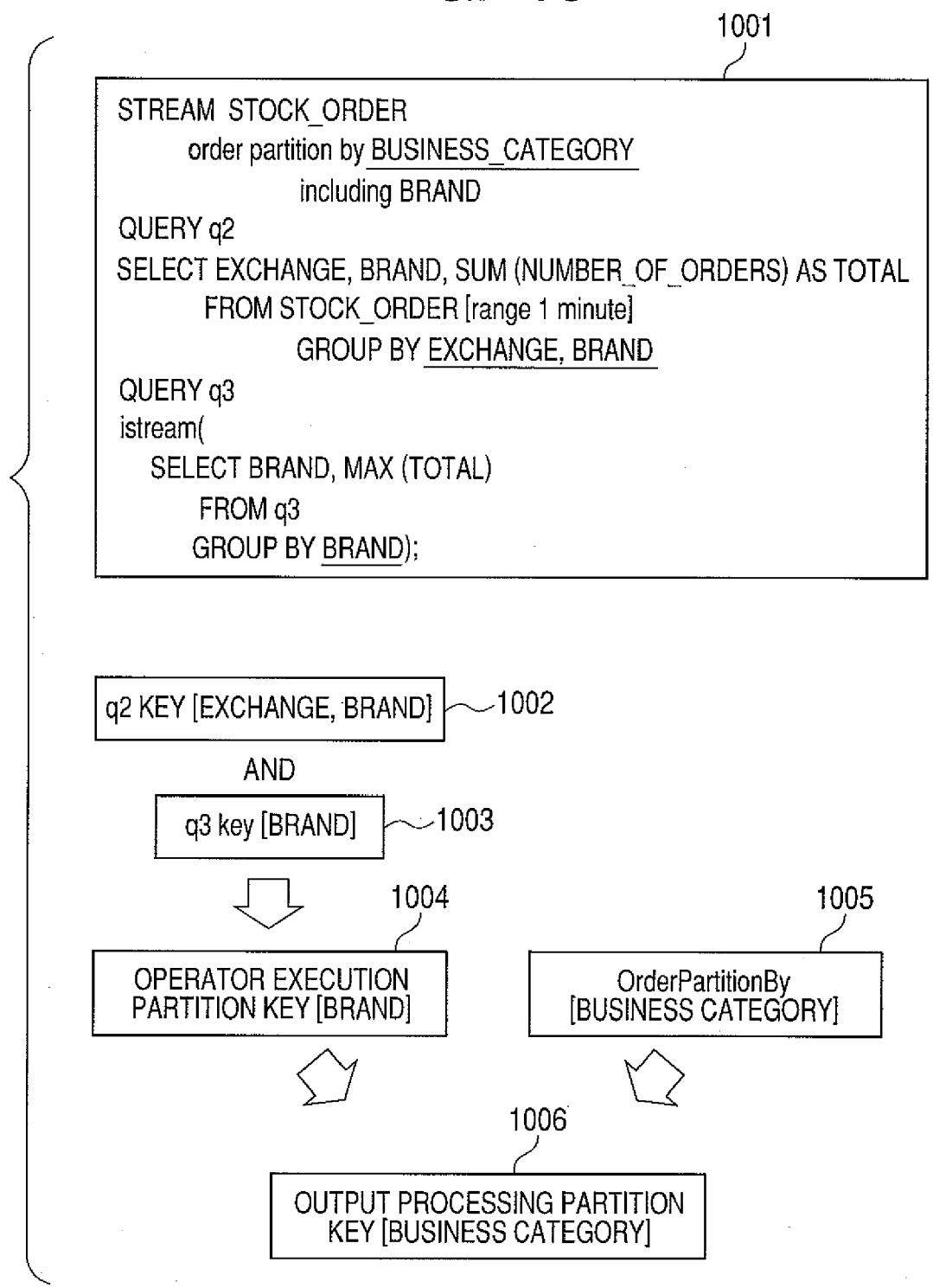
FIG. 10 is a drawing showing an operation example of calculating an output processing partition key in a first embodiment.

As shown in FIG. 10, a query 1001 includes queries q2 and q3. Like the query q1, the query q2 inputs a stream stock_order, and outputs the total number_of_orders in units of minutes for each exchange and for each brand. The query q3 outputs the maximum number_of_orders of each brand from the total number_of_orders by exchange by brand, outputted by the query q2. In the query q2, from the operator group by, execution partition key is extracted as {exchange, brand} (1002), and likewise, in the query q3, execution partition key is extracted as {brand} (1003). Therefore, operator execution partition key is calculated as {brand} (1004) by taking the product set of the execution partition keys of the queries q2 and q3 (operation of 502 and 503).

The query 1001 specifies a column business_category of the stream by the syntax Order Partition by. Therefore, the OrderPartitionBy key is {business_category} (1005) (operation of 601), and there is no value expression including the same column as the operator execution partition key {brand}. However, in the query 1001, {brand} is further specified in the syntax including. Therefore, stream data having same {brand} always has same {business_category}. Therefore, {business_category} (1006) is calculated as output processing partition key (operation of 606).

Figure 11:
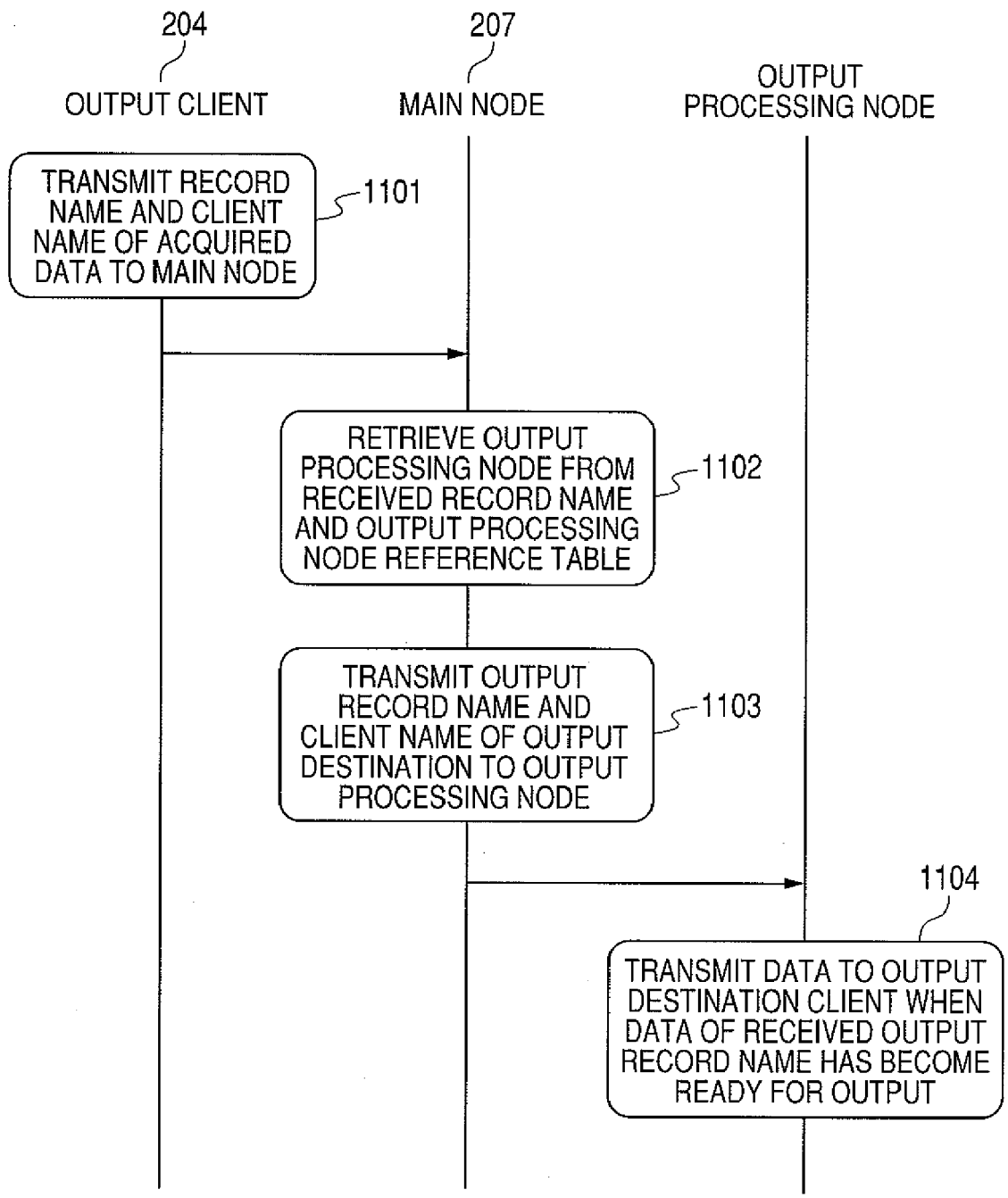
FIG. 11 is a drawing showing a flowchart of query execution in a first embodiment.

The following details query execution operation. FIG. 11 is a flowchart of execution operation. In this embodiment, since plural output processing nodes exist, nodes to which data acquired by the output client is outputted cannot be grasped in advance. Therefore, operation below is added to the stream data processing system.

The output client 204 transmits the record name and client name of data to be acquired to the main node 207 (1101). The main node 207 retrieves a node that outputs corresponding data, from the output processing node reference table 211 stored during query registration, using the record name (1102). Furthermore, the main node 207 transmits the record name and output client name to the detected output processing node (1103). The output processing node compares the record name received from the main node with the record name of output data subjected to operator execution. If the record names match, the output processing node outputs the data to the client of a name transferred from the main node 207 (1104).

Figure 12:
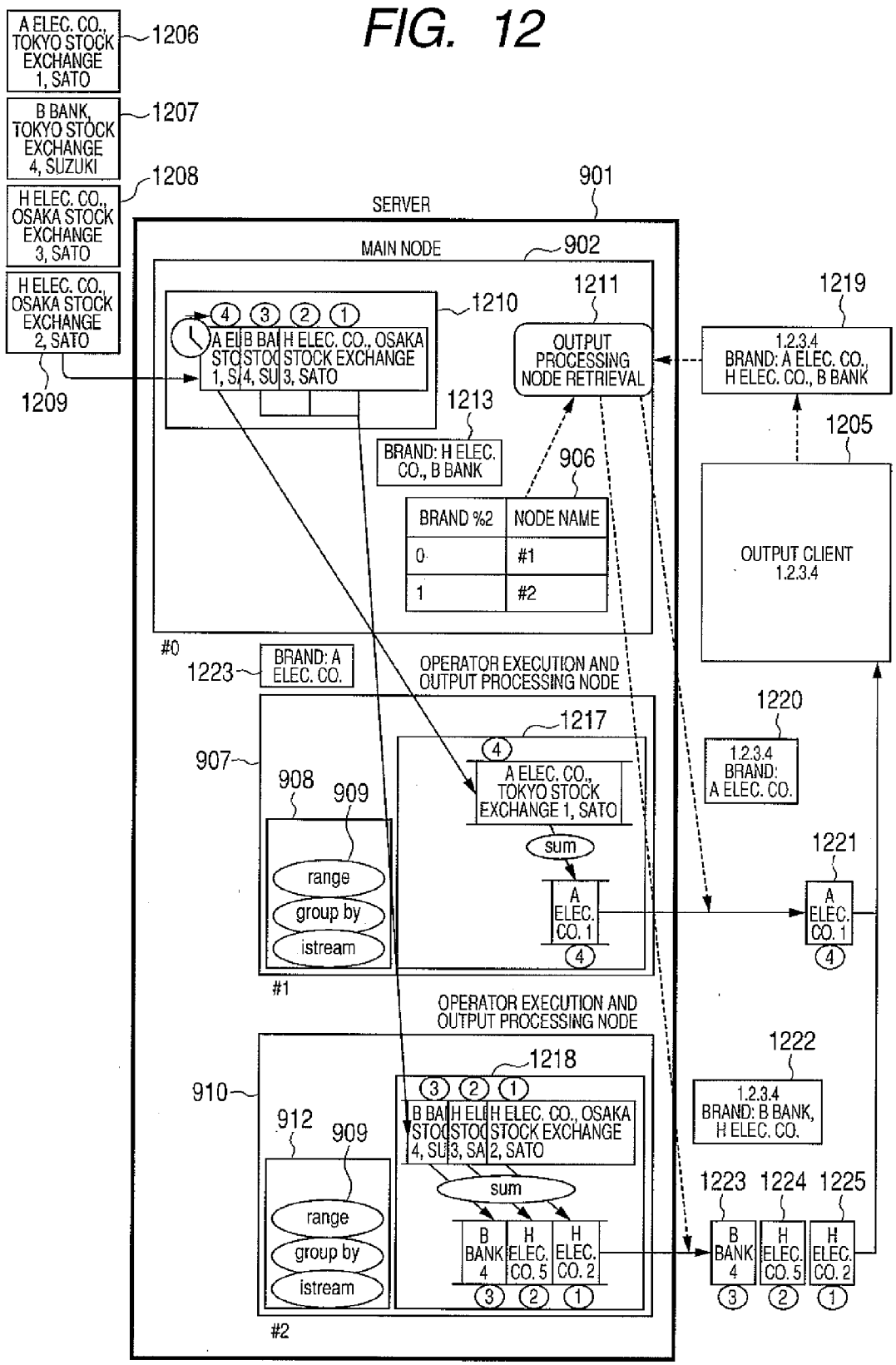
FIG. 12 is a drawing showing an operation example of query execution in a first embodiment.

FIG. 12 shows query execution operation when the query 301 shown in FIG. 3 is used. The execution is started when data has been inputted for the query 301 from the input client 201. The main node #0 (902) of the server 901 adds time stamps to input data 1206 to 1209 (1210), and transmits the added data to execution and output processing nodes #1 (907) and #2 (910) according to an operator execution node reference table (output processing node reference table) 906. It is assumed that the hash value of brand A Electric Company is 0 and the hash value of brands H Electric Company and B Bank is 1. The main node transmits data 1223 of the brand A Electric Company to the execution and output processing node #1 (907), and data 1213 of the brands H Electric Company and B Bank to the execution and output processing node #2 (910). The execution and output processing nodes #1 and #2 process the received data by operators (range, group by, istream) specified in operator trees 909, respectively.

On the other hand, an output client 1.2.3.4 (IP address) (1205) transmits the record names A Electric Company, H Electric Company, and B Bank of data to be acquired, and client name 1.2.3.4 (1219) to the main node #0 (operation of 1101). The main node #0 retrieves a node that outputs the data of the received record names by referring to the output processing node reference table 906 (1211).

Specifically, according to the output processing node reference table 906, data of the security name A Electric Company is outputted from the execution and output processing node #1, and data of the security names H Electric Company and B Bank is outputted from the execution and output processing node #2 (1211). The main node transmits the output client name 1.2.3.4 and an security name corresponding to each node to the each output processing node. "brand A Electric Company" (1220) is transmitted to the execution and output processing node #1, and "brands B Electric Company and H Electric Company" (1222) is transmitted to the execution and output processing node #2 (operation of 1103).

The execution and output processing node #1 processes the operators (1217), then outputs data (1221) of the security name A Electric Company to the output client 1.2.3.4, based on information 1220 from the main node #0. The execution and output processing node #2 executes the operators, then outputs data (1223 to 1225) of the security names B Bank and H Electric Company to the output client 1.2.3.4, based on information 1222 from the main node #0 (operation of 1104).

Figure 13:
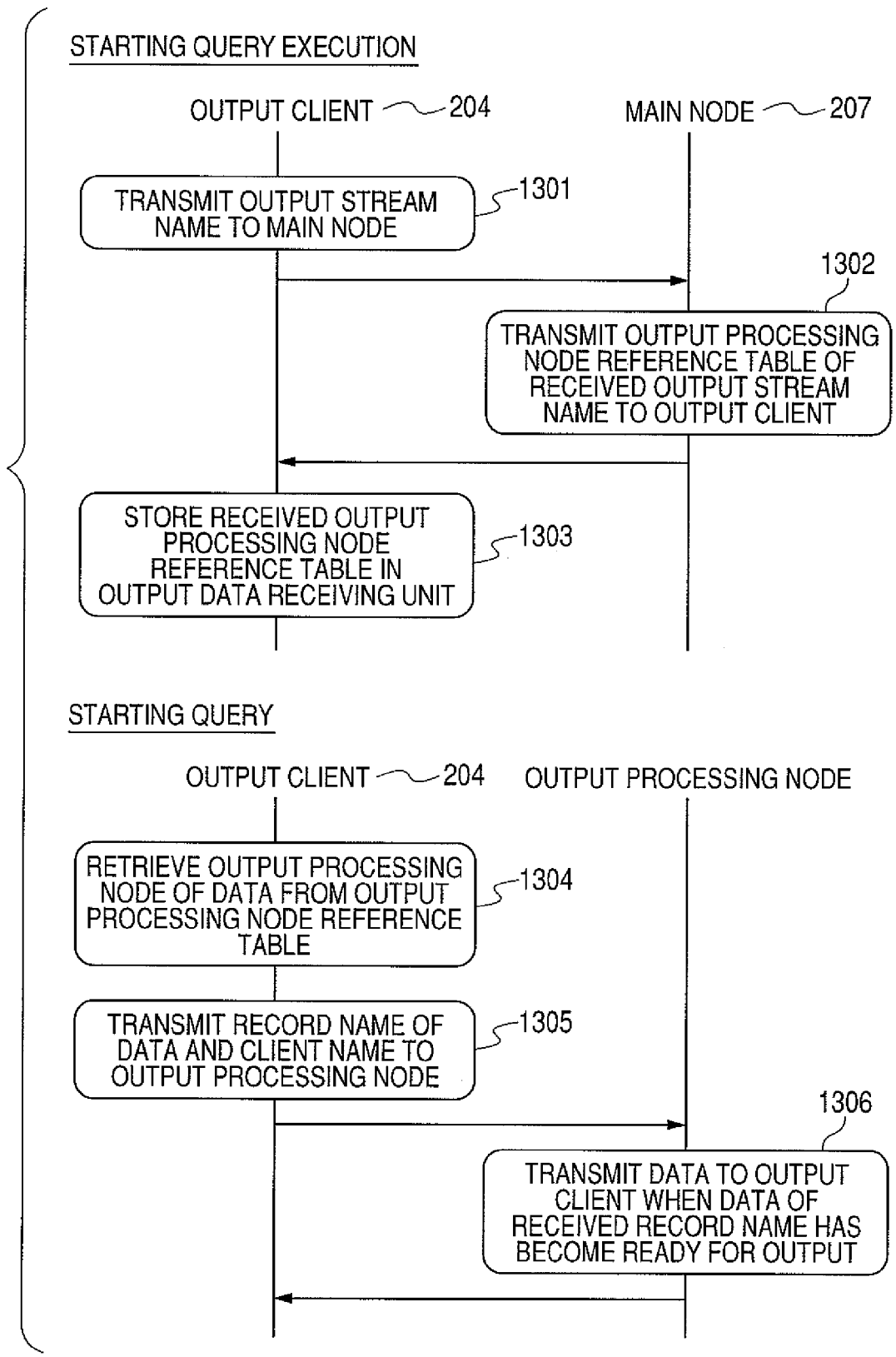
FIG. 13 is a drawing showing a flowchart of output processing node retrieval processing of a client in a first embodiment.

The following describes an extension method in the first embodiment. First, output processing node management in a client side is described. In the basic operation, the output processing node reference table 211 is stored in the main node 207, and an output processing node is retrieved using the output processing node reference table 211. However, output processing node derivation processing may be performed in an output client, not in a node of the server. Many clients of output destination often exist in stream data processing. In such a case, instead of retrieving an output processing node in the server, output processing node management can be executed in parallel without newly adding a server and node. FIG. 13 is a flowchart of the extension method.

In the upper portion of FIG. 13, the output client 204 transmits the name of an output stream to the main node 207 when query execution is started (1301). The main node 207 transmits an output processing node reference table corresponding to the received output stream name to the output client (1302). Finally, the output client stores the received output processing node reference table in the output data receiving unit (1303).

During query execution shown in the lower portion of FIG. 13, the output client refers to the output processing node reference table to retrieve an output processing node by the record name of data to be acquired (1304). Then, it transmits the record name of the data and the client name to the output processing node (1305). The output processing node compares the record name of data having been subjected to operator execution, and the record name received from the output client, and when they match, outputs the data to the output client (1306).

Figure 14:
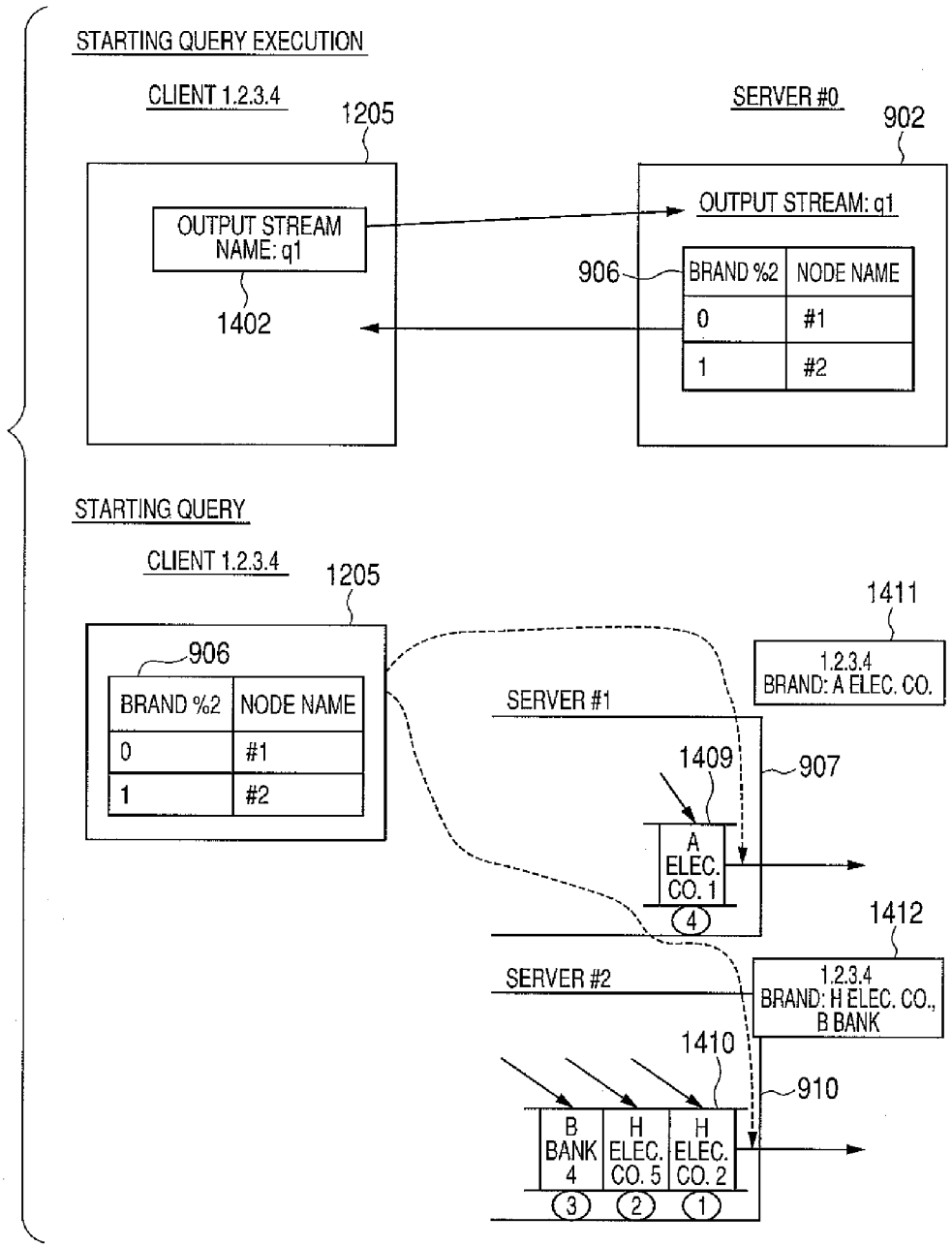
FIG. 14 is a drawing showing an operation example of output processing node retrieval processing of a client in a first embodiment.

FIG. 14 shows output processing node management operation by a client that uses the example of the query 301.

During query execution start shown in the upper portion of FIG. 14, an output client 1.2.3.4 (1205) transfers an output stream name q1 (1402) to the main node #0 (902) (operation of 1301). The main node #0 generates an output processing node reference table corresponding to the output stream name q1 (1402) and stores it in the output processing node reference table storage area. The main node transfers the stored table to the client 1.2.3.4 (operation of 1302).

During query execution shown in the lower portion of FIG. 14, the client 1.2.3.4 refers to the output processing node reference table 906, and detects a data output processing node of the brand A Electric Company to be acquired as #1, and a data output processing node of the brands H Electric Company and B Bank to be acquired as #2 (operation of 1304). Along with information (1411, 1412) of the client name "1.2.3.4," the client 1.2.3.4 transmits information (1411) of "brand A Electric Company" to the output processing node #1 and information (1412) of "brand H Electric Company, B Bank" to the output processing node #2 (operation of 1305). After the output processing nodes #1 and #2 process operators for the input data, the output processing node #1 outputs data (1409) of the security name A Electric Company from information (1411) of "brand A Electric Company" to the client 1.2.3.4, and the output processing node #2 outputs data (1410) of the security names H Electric Company and B Bank to the client 1.2.3.4 (operation of 1306).

FIG. 15 shows an extension method on processing that changes output processing nodes during execution. In the stream data processing system, data is inputted during execution. Since nodes become overloaded because of a high data input rate or deviation in types of input data, the need to change a method for distributing data in output processing nodes occurs during execution.

The following describes a method for changing output processing nodes during execution when an output processing node reference table is placed in a client. In the flow of the upper portion of FIG. 15, when changing a data allocation method, the output processing node reference table in the main node is updated, and the main node transmits the updated output processing node reference table and the name of its output stream to the output client (1501). The output client replaces an output processing node reference table corresponding to the received output stream name by the received table (1502).

With reference to the lower portion of FIG. 15, the following describes the operation of changing output processing nodes during execution by using the query 301 as an example. Before a change is made, data having brand % 2 of 0 is distributed to #1, and data having brand % 2 of 1 is distributed to #2. It is assumed that, by a change, output processing node #3 is newly added, data having brand % 4 of 1 is distributed to #2, and data having brand % 4 of 3 is distributed to #3. At this time, the main node #0 (902) transfers the output processing node reference table 1506 updated in the main node to the output client 1.2.3.4 (1205) along with the output stream name q1 (1402) (operation of 1501). The output client 1.2.3.4 replaces the output processing node reference table of output stream name q1 by the updated output processing node reference table 1506 (operation of 1502). After that, the output client 1.2.3.4 grasps the output processing node of acquired data by referring to the replaced output processing node reference table.

The following describes the operation of the first embodiment and its effect by using an example of vehicle jam detection query, particularly the operation of calculating an output processing partition key by using the lowest common multiple (operation of 605 and 606).

Figure 16:
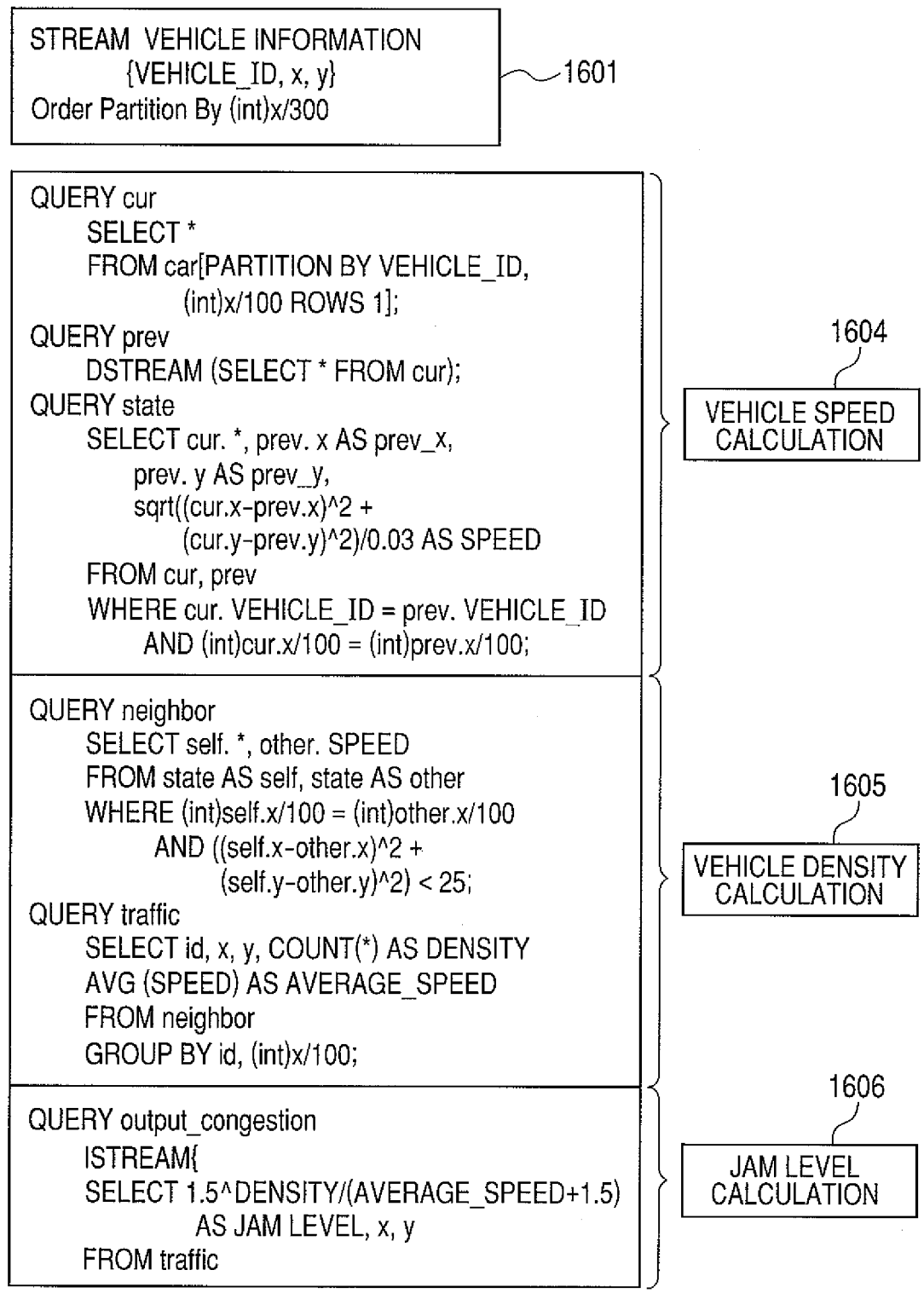
FIG. 16 is a drawing showing an example of query definition of vehicle jam detection query processing in a first embodiment.

FIG. 16 shows a vehicle jam query. The query inputs a stream vehicle information 1601 having vehicle_id, x, and y as columns. The vehicle_id is allocated to each vehicle, x and y indicate position information of the each vehicle, and the position information of the each vehicle is periodically distributed to the stream vehicle information. The query calculates a vehicle speed from the current and immediately preceding position information (x, y) of each vehicle (1604). It also calculates a vehicle density in the neighborhood of the each vehicle from position information of plural vehicles (1605). It calculates a jam level in the neighborhood of each vehicle from the vehicle speed and the vehicle density (1606).

It is assumed that the user demands from the above query that jam information of vehicles running near is updated in a time order. Specifically, the user specifies (int) x/300 in the syntax Order Partition By for the input stream vehicle information (1601) to tell the system to process jam information in a correct order for each (int) x/300, that is, in the range of 0 to 299, and 300 to 599 of x.

Figure 17:
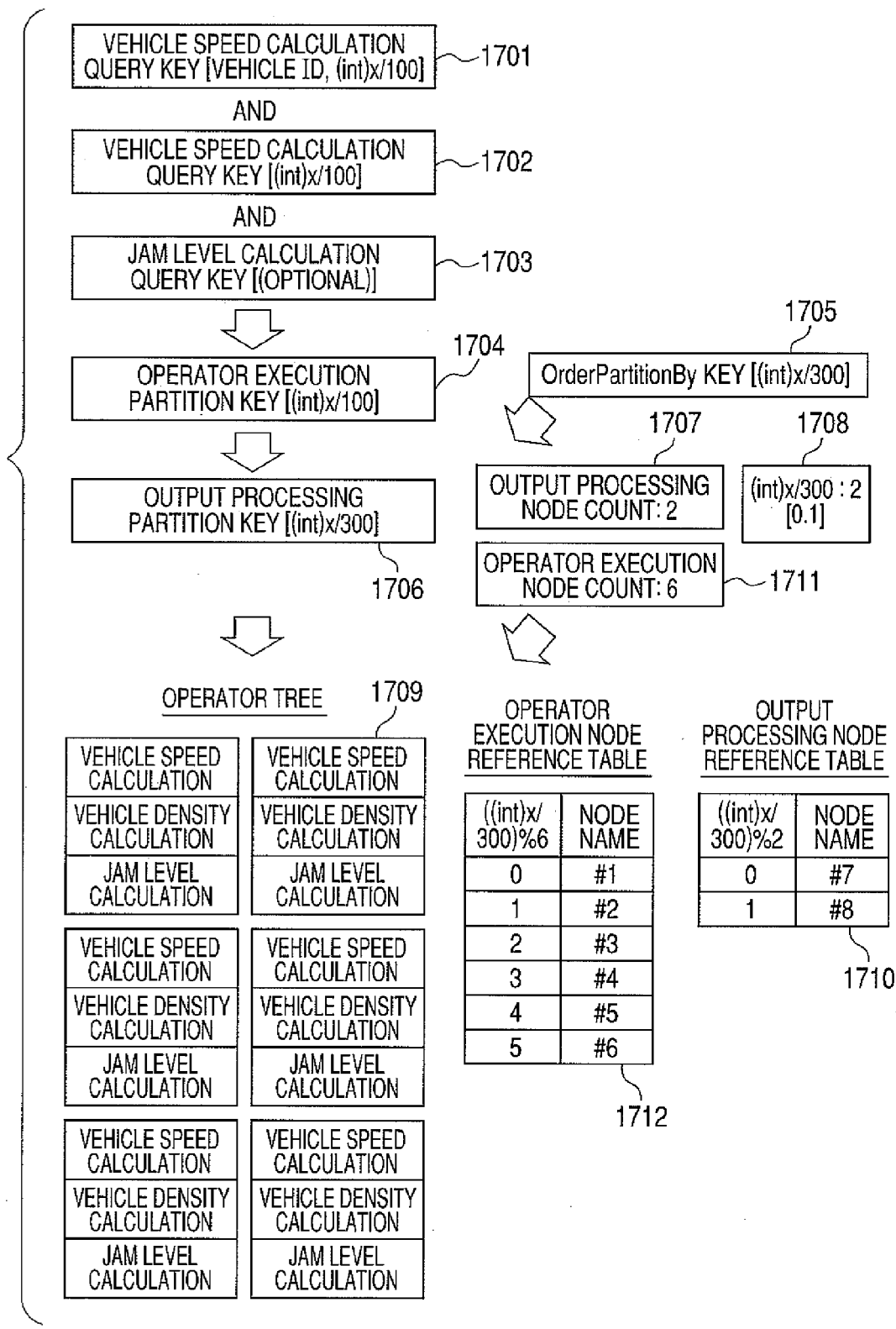
FIG. 17 is a drawing an operation example of query registration of vehicle jam detection query processing in a first embodiment.

FIG. 17 shows an example of registration operation using the query 1602.

First, the main node calculates an operator execution partition key. The query 1602 includes queries on vehicle speed calculation (1604), vehicle density calculation (1605), and jam level calculation (1606). The respective execution partition keys of the queries are {vehicle_id, (int)x/100} (1701), {(int) x/100} (1702), and {(optional)} (1703) by taking the product set of execution partition keys of operators of the queries (operation of 502 and 503). As a result, an operator execution partition key is the product set {(int) x/100} (1704) of the execution partition keys of the queries (operation of 503 and 504).

Next, the main node calculates an output processing partition key. OrderPartitionBy key is obtained as {(int)x/300} (1705) from the Order Partition By syntax (operation of 601). The operator execution partition key {(int)/100} and OrderPartitionBy key {(int)x/300} both have value expressions (int)x/100 and (int)x/300 containing column x of the input stream as elements, and the value expressions have the form of x/n (n is an integer). Therefore, by taking the lowest common multiple of 100 and 300, an output processing partition key is calculated as {(int)/300} (1706) (operation of 604 and 605).

The main node analyzes a data allocation method from the processing keys. From an operator execution node count 6 (1711) specified by the user, and the number of possible values 2 (1708) of the value expression (int)x/300 as an element of the output processing partition key (operation of 701), since the operator execution node count is greater than the number of possible values of the value expression, the main node determines a method for distributing data to a maximum of two (1707) nodes, and generates an output processing node reference table 1710 (operation of 702). It analyzes a method for distributing data to a maximum of six nodes (operator execution node count) in operator execution. Since the operator execution partition key {(int)x/100} allows data to be allocated to a maximum of six nodes, the main node determines a method for distributing data to six nodes, and generates an operator execution node reference table 1712. It generates six (operator execution node count) operator trees 1709 (operation of 705). Finally, the main node distributes the generated operator trees 1709 to operator execution nodes #1 to #6, and distributes the output processing node reference table 1710 and the operator execution node reference table 1712 to the main node #0.

FIG. 18 shows an example of execution operation that uses the query 1602 as an example. As described previously, the query 1602 defines #1 to 6 (1802 to 1807) as nodes that perform operator execution, and #7 (1808) and #8 (1809) as nodes that output operator execution results. Data distributed using the operator execution node reference table 1709 in the main node #0 is executed by the query on vehicle speed calculation, vehicle density calculation (1810), and jam level calculation (1811) in the nodes #1 to 6. For example, vehicle information data having a range of 200 to 300 as x is inputted in the node #3, and jam level information data is outputted as in 1812. In the node #4, data having a range of 300 to 400 as x is processed and outputted as in 1815. Jam information data outputted in the nodes #1 to 3 is transmitted to the node #7, and output data of the nodes 4 to 6 is transmitted to the node #8. The nodes #7 and #8 sort the transmitted data by input order, and output it to clients. For example, the node #7 compares time stamp values of latest data of the nodes #1 to #3 (1816), and outputs data (1817) having the oldest time stamp to clients (1818). The node #8 compares latest data of the nodes #4 to #6 (1819) to output data (1820) having the oldest time stamp value to clients (1821).

Second Embodiment

The following describes a second embodiment. In the first embodiment, high throughput and low latency have been achieved by limiting the assurance of input order to a specified order assurance group. Therefore, time may deviate significantly in a different data group, depending on a difference in loads among nodes. However, although some applications do not require strict adherence to input order, they may dislike a large deviation. For example, in queries on the aggregation of stock transactions, when it is assumed that plural users determine their investment action by referring to plural pieces of brand information, a significant lag of output time by brand must be avoided in terms of accuracy and fairness. When information of stock A. Electric Company is inputted later than information of stock B Bank Company, investors watching the stock A Electric Company will lag in action investors watching the stock B Bank Company. Investors who intend to select advantageous action by making comparisons between the stock A Electric Company and the stock B Bank Company will make a wrong judgment. In the query of vehicle jam detection, order is not maintained in the boundary (x=300 in the case of the query 1602) of a specified order assurance group. Therefore, for example, since jam information may be not displayed in time series in vehicles running near the boundary of a data group, the user may have difficulty in viewing in car navigation display and make a mistake to select a running route.

Figure 19:
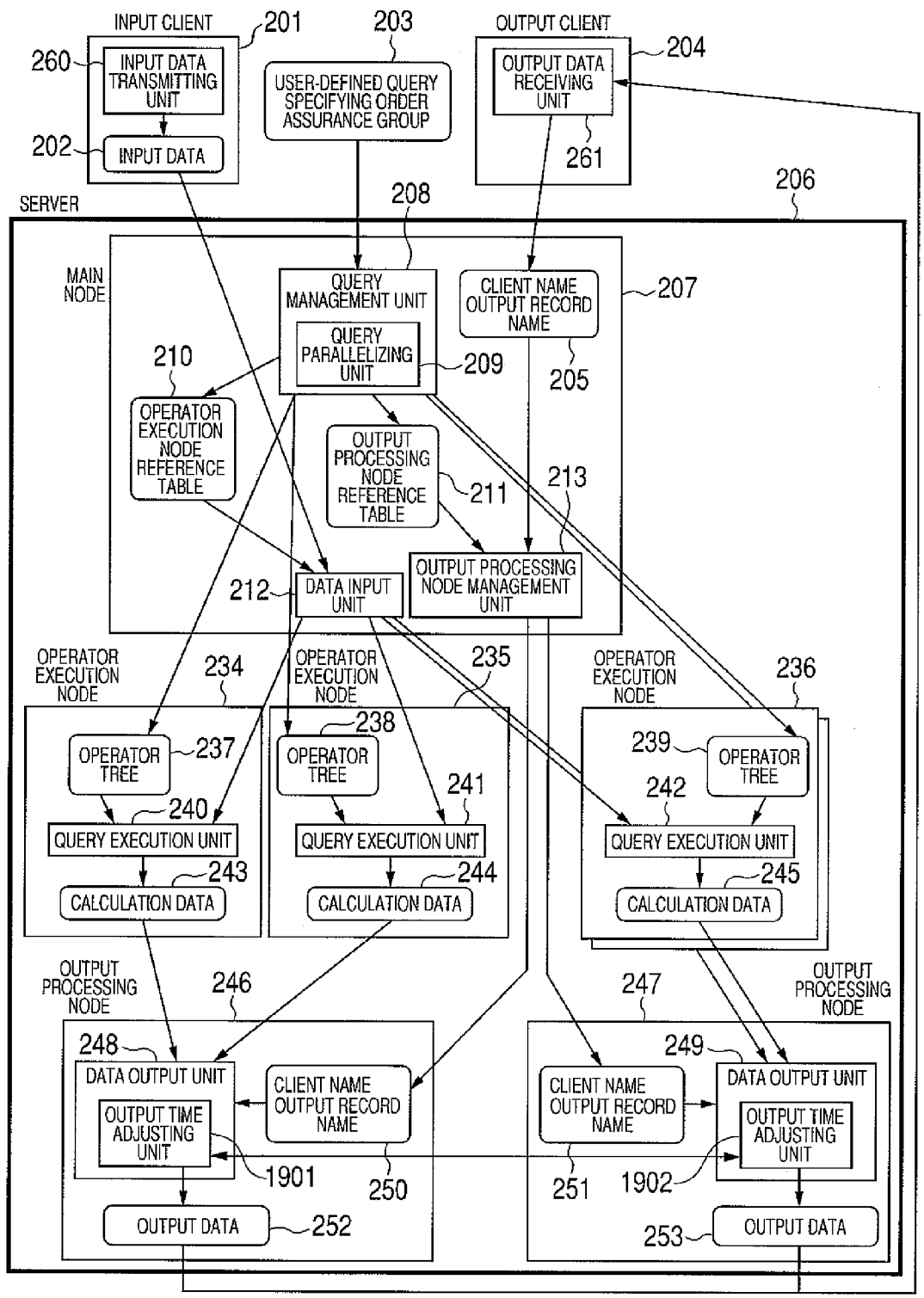
FIG. 19 is an operation diagram of an output processing node control method in a second embodiment.
Figure 20:
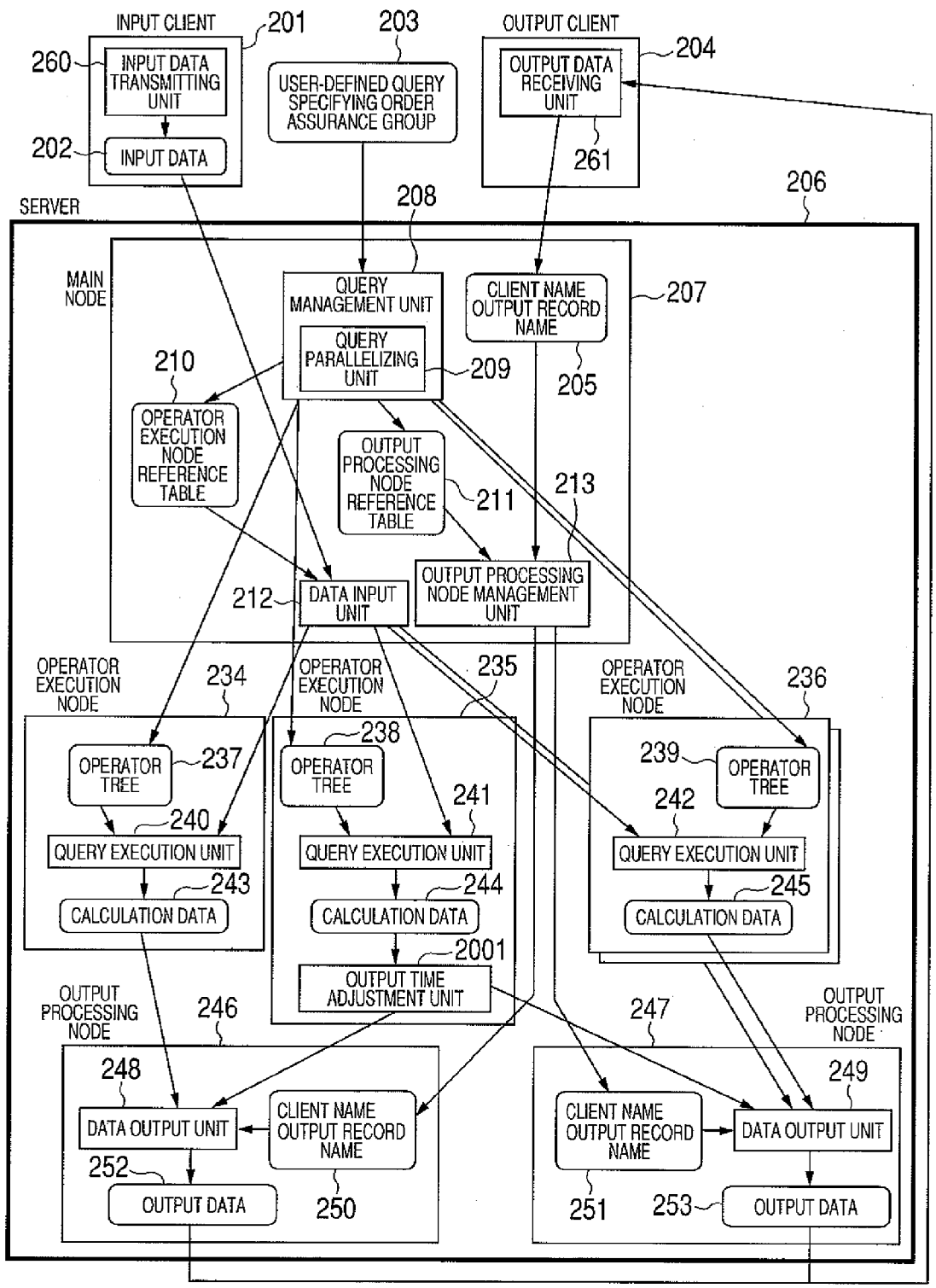
FIG. 20 is an operation diagram of an operator execution node control method in a second embodiment.

Accordingly, in the second embodiment, a time lag width is confined within a certain range even among data different in order assurance group. FIGS. 19 and 20 each show a configuration of the second embodiment. FIG. 19 shows a method for controlling a lag width in output processing nodes, and FIG. 20 shows a method for controlling a lag width in a processing node. The output processing node control method, during data output, adds output time adjusting units 1901 and 1902 to the data processing units 248 and 249 of the stream data processing engines in the processing nodes 246 and 247 to adjust output time by exchanging the time of mutual output data. On the other hand, the operator execution node control method adjusts output time by an output time adjusting unit 2001 added to the stream data processing engine of the operator execution node 235. In short, the output time adjusting unit 2001 transfers calculation data 244 processed in the query execution unit 241 to both the output processing nodes 246 and 247 while adjusting transmission time.

In the second embodiment, throughput is increased in comparison with existing data parallelism methods by confining a time lag width within a certain range. For example, when processing is performed with operator execution node count 6 and output processing node count 2 (FIGS. 23 and 25), if a processible input rate in one output processing node is T (tuple/second), a processible input rate in the whole is T (tuple/second) in existing data parallelism methods, while in the second embodiment, it is 1.5 T (when a processible input rate in one processing node is T/3 (tuple/second) or more).

The following details the operation of the second embodiment. In the second embodiment, a syntax limit is newly added to the stream data processing description language to specify a permissible time lag width for data different in a data group specified in the Order Partition By syntax. In a query 2101 in FIG. 21, by specifying "brand" as key in the syntax Order Partition By and 1 second in the limit syntax, a lag of output time is confined within one second even among different brands. Specification of a permissible time lag, like specification of order assurance group, may be made in query definition and other locations, besides stream definition. The limit syntax, which is analyzed along with the OrderPartitionBy syntax, transfers information about permissible time lag width to relevant nodes, as well as operator trees and an output processing node reference table.

Figure 22:
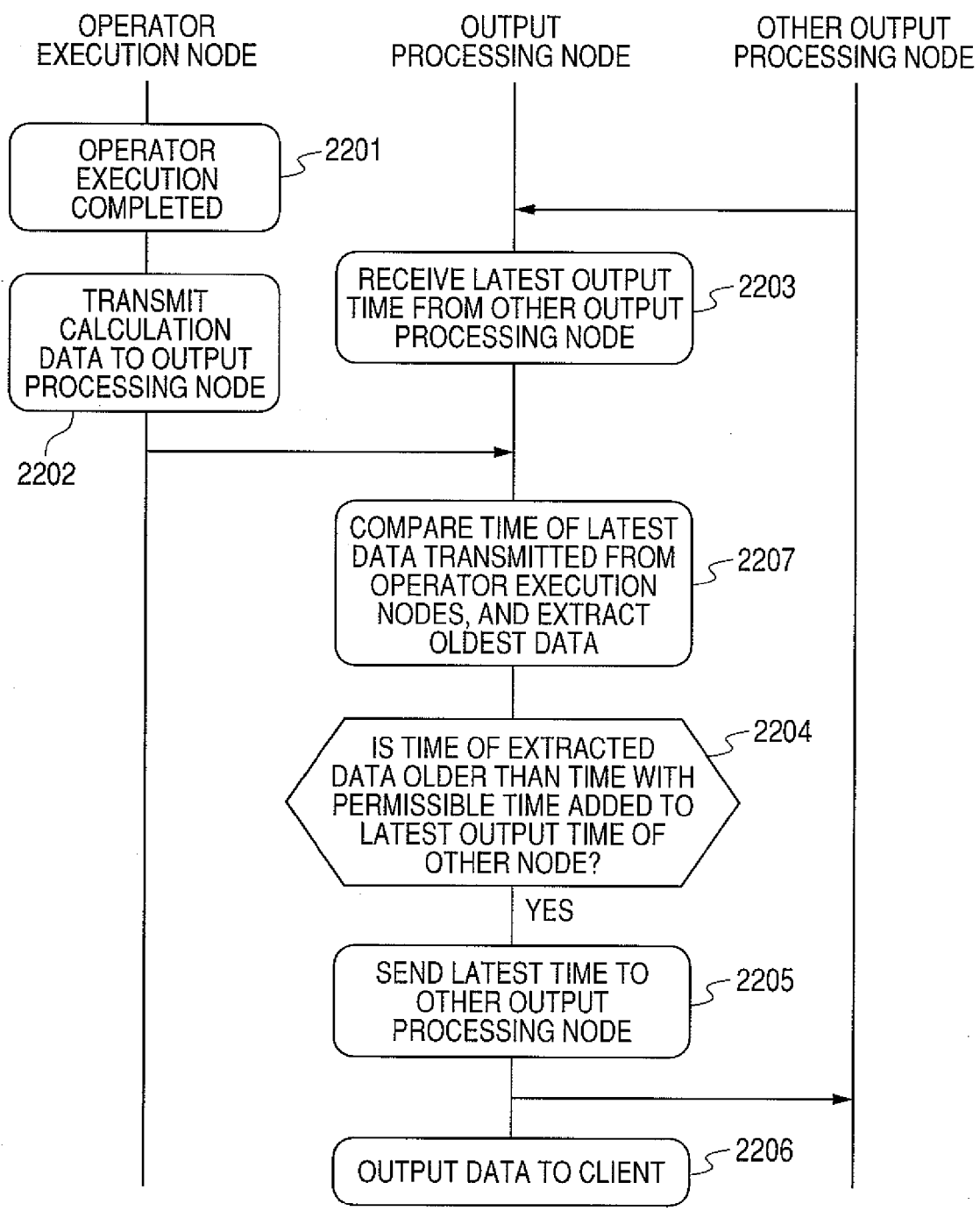
FIG. 22 is a flowchart of an output processing node control method in a second embodiment.

FIG. 22 is a flowchart of the output processing node control method. The operator execution nodes process operators as in the first embodiment. After the processing is completed (2201), the operator execution nodes transmit calculation data to the output processing nodes (2202). On the other hand, the output processing nodes mutually exchange time stamp values of output data. They receive time stamp values from other output processing nodes (2203), or when they receive calculation data from the operator execution nodes (2203), they compare the times of the latest data transmitted from the operator execution nodes and extract the oldest data (2207). They compare the time stamp value of the extracted data with time obtained by adding a permissible time lag value to the latest time stamp value transferred from the other nodes. If the time stamp value of the extracted data is older (2204), the output processing nodes output the data to clients (2206). At this time, they send the time stamp value of the outputted data to the other output processing nodes (2205).

Figure 23:
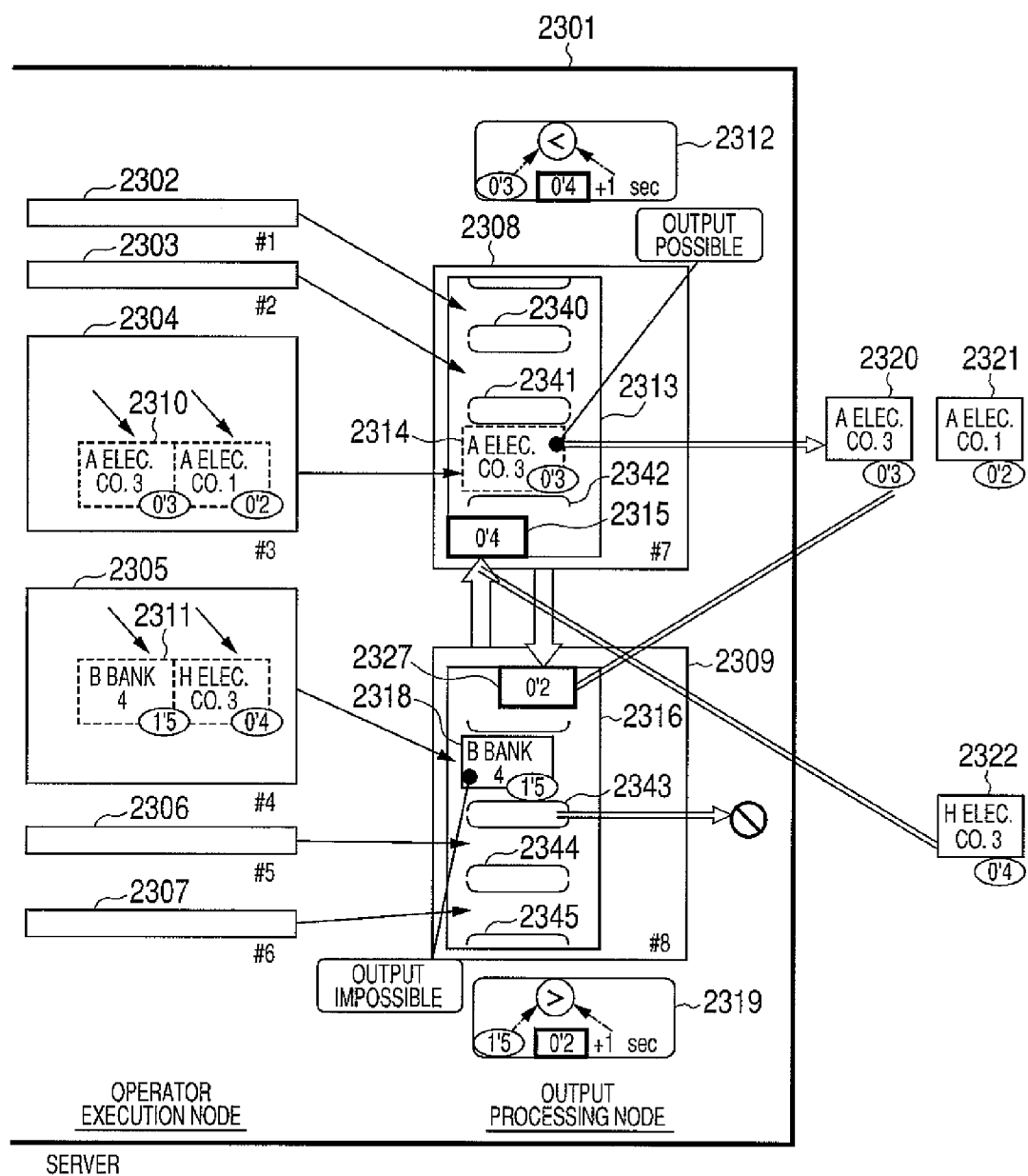
FIG. 23 is a drawing showing an operation example of an output processing node control method in a second embodiment.

FIG. 23 shows an example of the operation of the output processing node control method that uses the query 2101. Nodes #1 to 6 (2302 to 2307) are nodes that process operators, and nodes #7 and 8 (2308 and 2309) are nodes that output processing results. Calculation data having been subjected to operator execution in the nodes #1 to 3 is transferred to the node #7, and data having been processed in the nodes #4 to 6 is, transferred to #8.

Data (2310) of the brand A Electric Company is processed in the node #3 (operation of 2201), and its processing result is outputted to the node #7 (operation of 2202). Data (2311) of the brands H Electric Company and B Bank is processed in the node #4 (operation of 2201), and its processing result is outputted to the node #8 (operation of 2202). The node #7 outputs data 2321, and since the time stamp value of the data 2321 is 0'2, it transfers the time stamp value 0'2 (2327) to the node #8 (operation of 2203). On the other hand, the node #8 outputs data 2322, and since the time stamp value of the data 2322 is 0'4, it transfers the time stamp value 0'4 (2315) to the node #7 (operation of 2203).

The node #7 compares the time stamp values of first data of queues 2340 to 2342 that hold calculation data transmitted from the nodes #1 to 3, and defines the oldest data (2314) as output data (operation of 2207). On the other hand, the node #8 compares the time stamp values of first data of queues 2343 to 2346 corresponding to the nodes #4 to #6, and defines the oldest data (2318) as output data (operation of 2207).

The node #7 compares the time stamp value 0'3 of the output data 2314 with a value obtained by adding permissible time 10 to the time stamp value 0'4 (2315) received from the node #8 (2312). Since the time stamp value of the output data 2314 is older, the node #7 transfers the output data 2320 to clients (operation of 2204 and 2206). The node #7 transfers the time stamp value 0'3 of the output data 2320 to the node #8 (operation of 2205).

On the other hand, the node #8 compares the time stamp value 1'5 of the output data 2318 with a value obtained by adding permissible time 10 to the time stamp value (2327) received from the node #7 (2319). Since the time stamp value of the output data 2318 is newer, the output data 2318 is not outputted to clients (operation of 2204).

Figure 24:
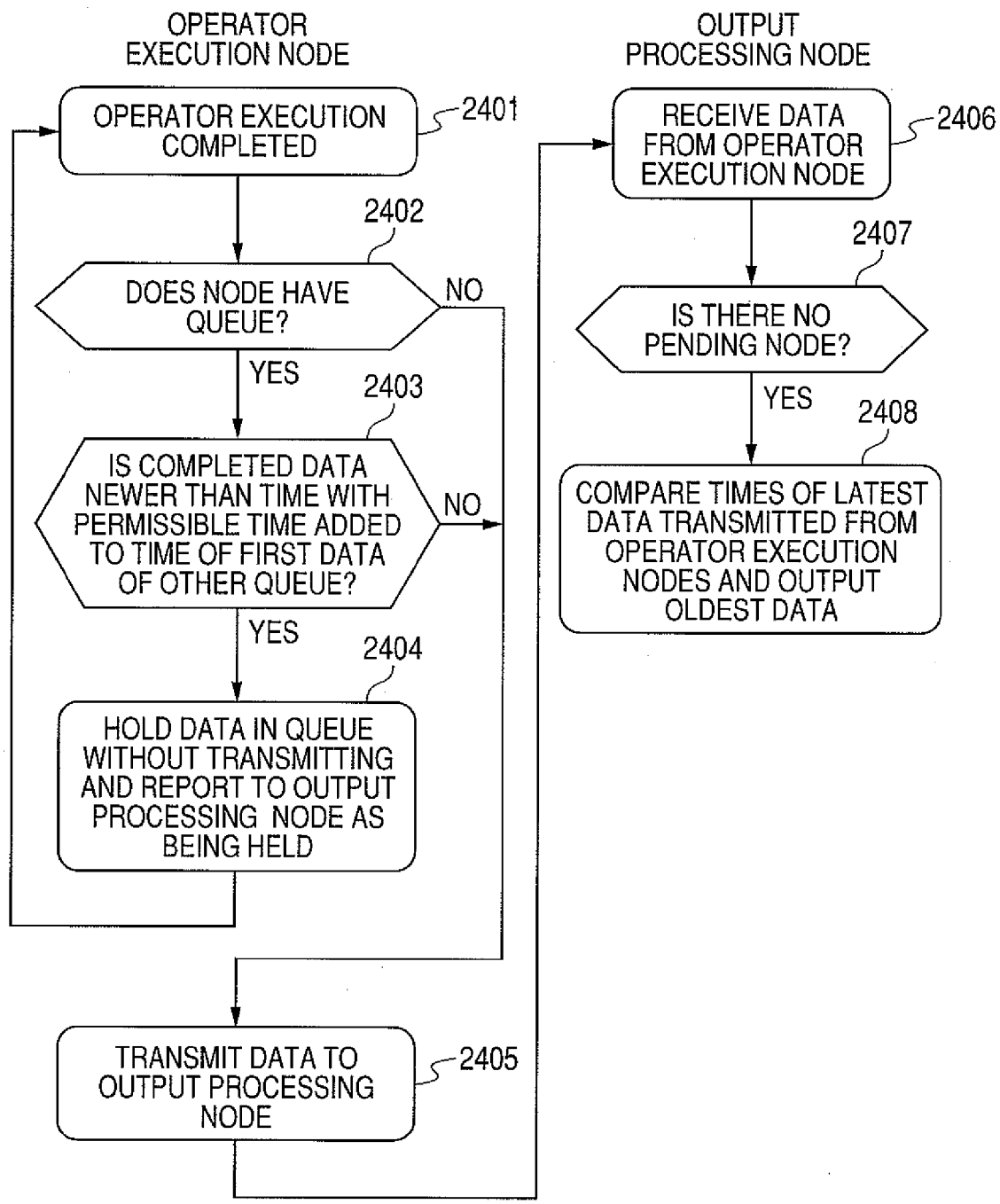
FIG. 24 is a flowchart of an operator execution node control method in a second embodiment.

The following describes the operation of the operator execution node output control method in this embodiment. FIG. 24 is a flowchart of the operator execution node output control method. The operator execution nodes process operators as in the first embodiment. After the operator execution is completed (2401), the operator execution nodes transmit calculation data to an output processing node (2405). At this time, in operator execution nodes (2402) having a shared queue, operation different from that of the first embodiment is performed. The operator execution nodes having a shared queue transfer the calculation data to plural output processing nodes. At this time, the shared queue holds data to be transferred to plural output processing nodes. Nodes having the shared queue, if the time stamp value of the calculation data is older than time obtained by adding permissible time to the time stamp value of first data of other queues, transmit the data to the output processing nodes (2403), and if newer, hold the data in the queue without transmitting the data (2404). They tell the output processing nodes that the data is being held (2404). The output processing nodes having received the data (2406), if other operator execution nodes are not pending (2407), compare times transmitted from the operator execution nodes and output the oldest data (2408).

Figure 25:
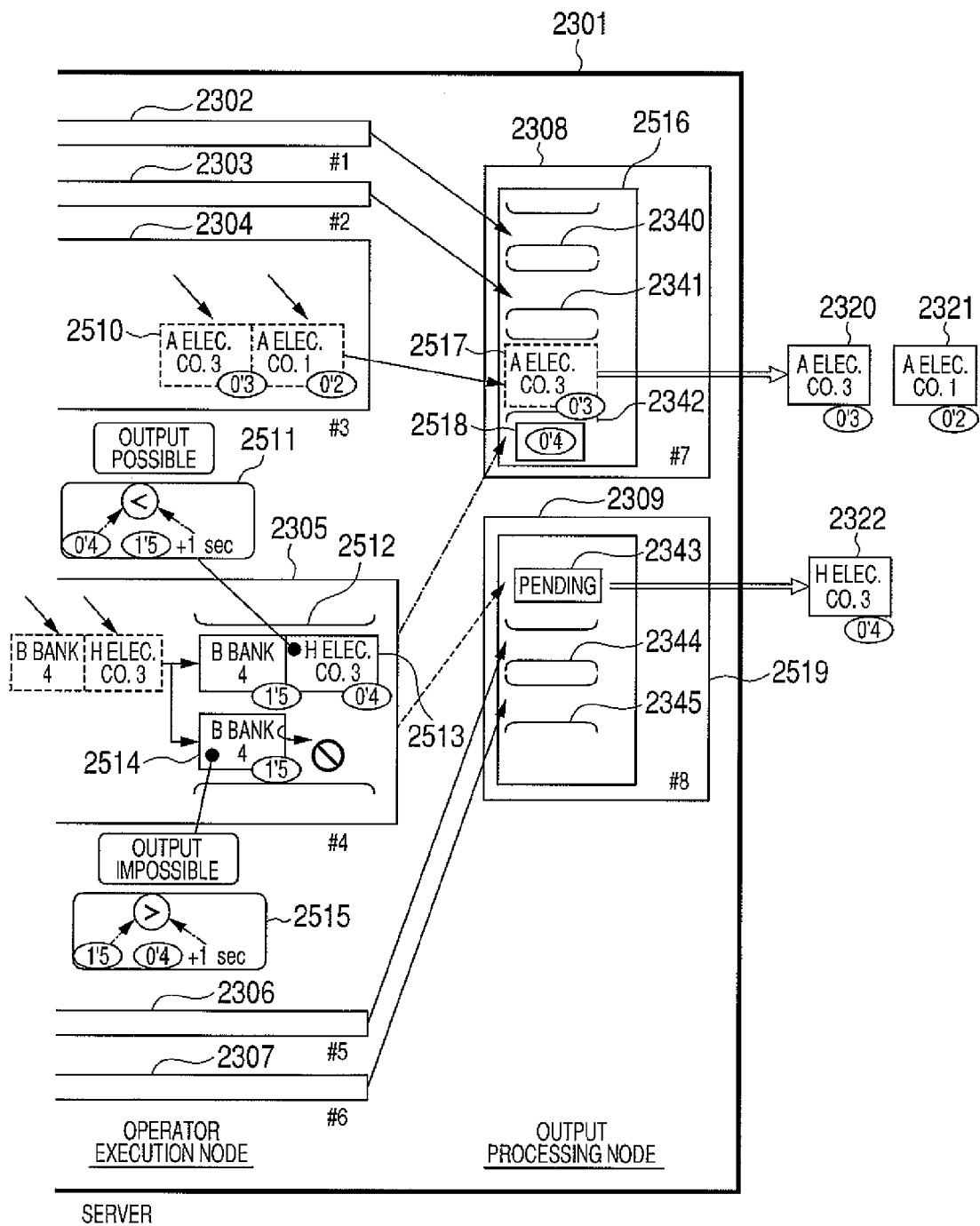
FIG. 25 is a drawing showing an operation example of an operator execution node control method in a second embodiment.

FIG. 25 shows an example of the operation of the operator execution node control method that uses the query 2101. Like FIG. 23, nodes #1 to 6 (2302 to 2307) are operator execution nodes, and nodes #7 and 8 (2308, 2309) are output processing nodes. Data having been processed in the nodes #1 to 3 and #4 to 6 are transferred to the nodes #7 and 8, respectively. For example, data (2510) of the brand A Electric Company is processed in the node #3, and the processed data is transferred to the node #7 (2517), and outputted to clients (2321). The node #4 has a shared queue 2512, and processes data (2513, 2514) of the brands H Electric Company and B Bank. The node #4 transfers the processed calculation data to the node #8, and outputs it to clients (2322). At the same time, it transfers the time stamp value of the calculation data to the node #7.

Now, the calculation data 2514 having been processed in the node #4 has been inputted to the shared queue 2512. At this time, the node #4 compares the time stamp value of the first data 2513 of the queue holding data transferred to the node #7 with a value obtained by adding a permissible time lag width 10 to the time stamp value of the first data 2514 of the queue holding data transferred to the node #8 (2511). Since the time stamp value of 2513 is older, the node #4 transfers a time stamp value 2518 to the node #7. The node #7 compares the first data (2517) of queues (2340 to 2342) holding calculation data from the nodes #1 to 3 with the time stamp value 2518. Since the data 2517 is the oldest data, the node #7 outputs it to clients (2320).

When the calculation data 2514 has been inputted to the shared queue 2512, the node #4 compares the time stamp value of the first data 2514 of the queue holding data transferred to the node #8 with a value obtained by adding a permissible time lag width 10 to the time stamp value of the first data 2513 of the queue holding data transferred to the node #8 (2515). Since, the time stamp value of 2514 is newer, the node #4 reports to the node #8 that the data is being held, and data of the queues (2344, 2345) holding calculation data from the nodes #5 and 6 is not outputted from the node #8.

Third Embodiment

Figure 26:
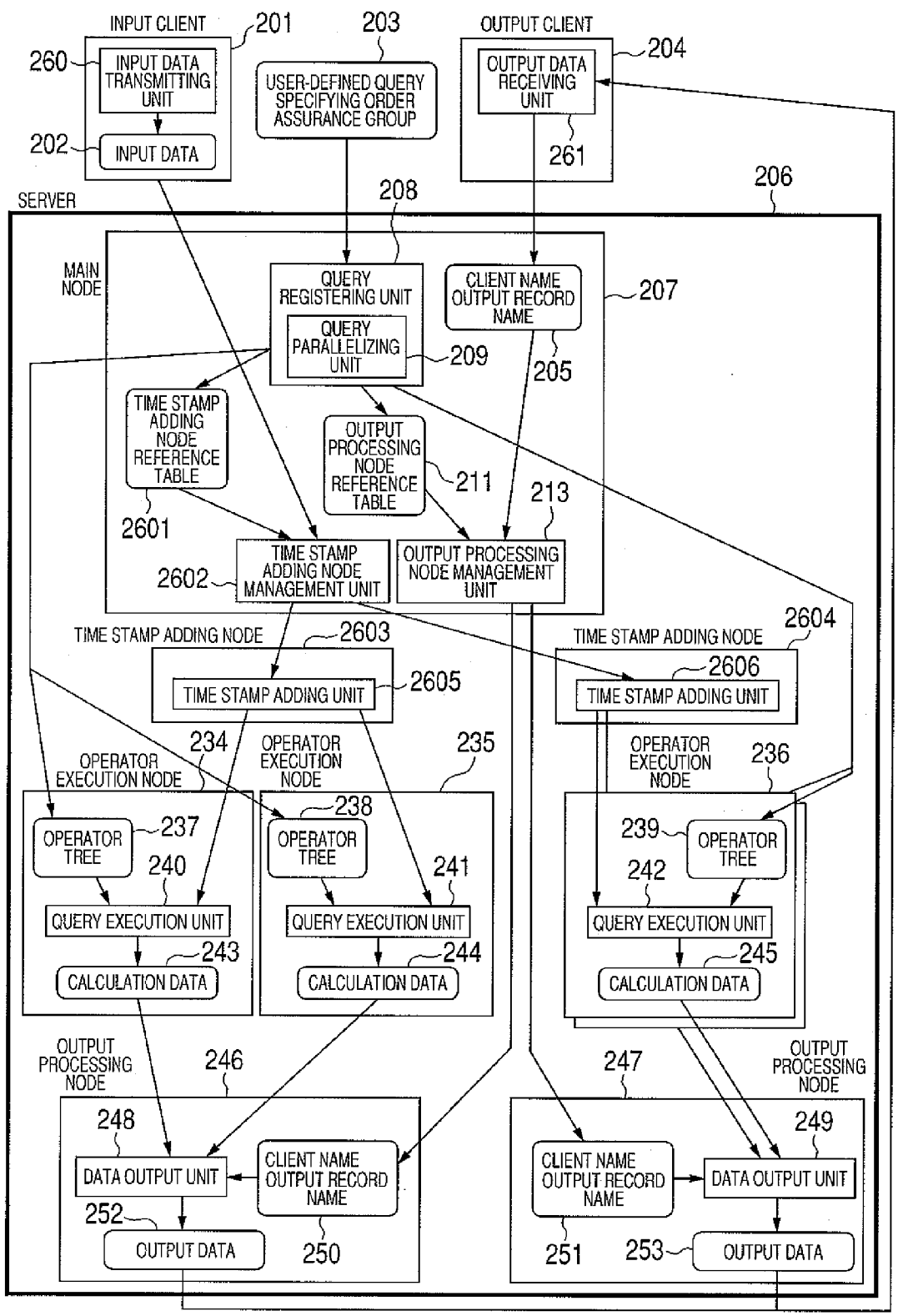
FIG. 26 is an operation diagram of a computer system in a third embodiment.

Finally, a third embodiment, in which plural time stamp adding nodes add time stamps, will be described. FIG. 26 is a drawing for explaining the operation of a third embodiment. Since time stamp adding processing is performed in one node though its description is omitted, there is a possibility that an increase in the number of nodes overloads the stamp adding processing and throughput does not increase beyond a certain level. Accordingly, in this embodiment, throughput is further increased by performing the time stamp processing in plural time stamp adding nodes added to the first node.

In the third embodiment, in the stream data processing server 206 as shown in FIG. 26, time stamp adding nodes 2603 and 2604 including time stamp adding units 2605 and 2606 in the stream data processing engine are added as a first node set. The stream data processing engine of the main node 207 includes a stamp adding node management unit 2602.

As operation, if the user-defined query 203 read into the main node 207 is specified to distribute time stamp adding processing, the query parallelism unit 209 analyzes a data distribution method for performing the time stamp adding processing of the query 203 in plural nodes. It generates a time stamp adding node reference table 2601 from the data distribution method. The time stamp adding node reference table 2601 is a table by which, with the record name of data as index, a node name to add the time stamp of the data is referred to.

When input data 202 is captured into the main node 207 during execution of the query, the stamp adding node management unit 2602 refers to the time stamp adding node reference table 2601, uses the record name of the input data 202 to retrieve the node name to add the time stamp of the data, and allocates the input data to the time stamp adding nodes 2603 and 2604. The time stamp adding unit 2605 and 2606 of the time stamp adding nodes 2603 and 2604 each add a time stamp to the data, and transfer the added data to the operator execution nodes 234 and 235. After the transfer, operators are processed as in the first and the second embodiments.

In the third embodiment, throughput is increased when the time stamp adding processing causes a bottleneck. For example, in the first embodiment, when processing is performed with operator execution node count 4 and output processing node count 2 (FIG. 12), if a processible input rate in the main node is T (tuple/second), a processible input rate in the whole is T (tuple/second) in the first embodiment (when a processible input rate of one processing and operator execution node is T/2 (tuple/second) or more). On the other hand, in the third embodiment, when processing is performed with 2 as the number of time stamp adding nodes (FIG. 29), a processible input rage in the whole is 2 T (tuple/second) (when a processible input rate of one processing and output processing node is T/2 (tuple/second) or more).

The following details the operation of the third embodiment. FIG. 27 is a flowchart at the time of query registration and execution.

First, the operation of query registration will be described with reference to the upper portion of FIG. 27. A query is marked in advance as to whether time stamp adding is performed in plural nodes. The marking may be made by use of new syntax, by a description in a setting file, or by using other methods. If the distribution of time stamp adding is specified, the main node analyzes a data distribution method in output processing as in the first embodiment (2701), then analyzes a data distribution method of time stamp adding processing so that data subjected to the output processing in a same node is always added with a time stamp in the same node (2702). The main node generates a time stamp adding node reference table from the data distribution method of the stamp adding processing and distributes it to the main node (2703).

The following describes the operation of query execution with reference to the lower portion of FIG. 27. The main node receives data from the client (2705), and retrieves the node name to add a time stamp from the time stamp adding node reference table by using the record name of the input data, and transmits the input data to a corresponding time stamp adding node (2706). The time stamp adding node adds a time stamp to the received data (2707), and transmits the data added with the time stamp to an operator execution node (2708). After that, the operator execution node subjects the received data to operator execution as in the first embodiment.

Figure 28:
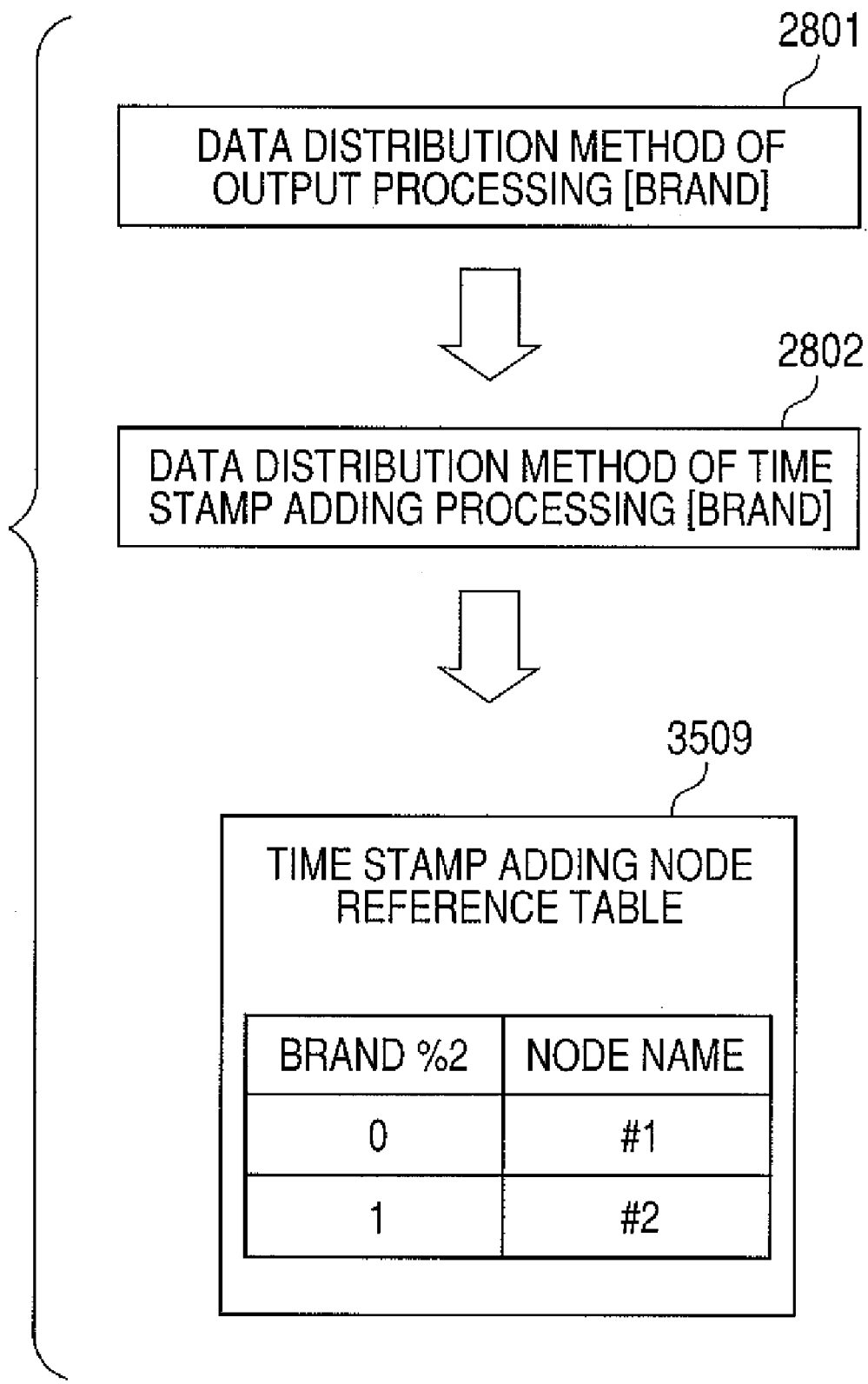
FIG. 28 is a drawing showing an operation example of query registration in a third embodiment.

FIG. 28 shows an example of the query registration that uses the query 301. As in the first embodiment, the main node determines a method for distributing data by column brand as a data distribution method in output processing as in the first embodiment. It determines a data distribution method based on column brand as in 2802 so that data subjected to output processing in a same node is always added with a time stamp in the same node (operation of 2702). It generates a time stamp adding node reference table 3509 from the data distribution method of the time stamp adding processing (operation of 2703). Finally, the main node transfers the time stamp adding node reference table 3509 to a corresponding node along with operator trees and the output processing node reference table (operation of 2703).

Figure 29:
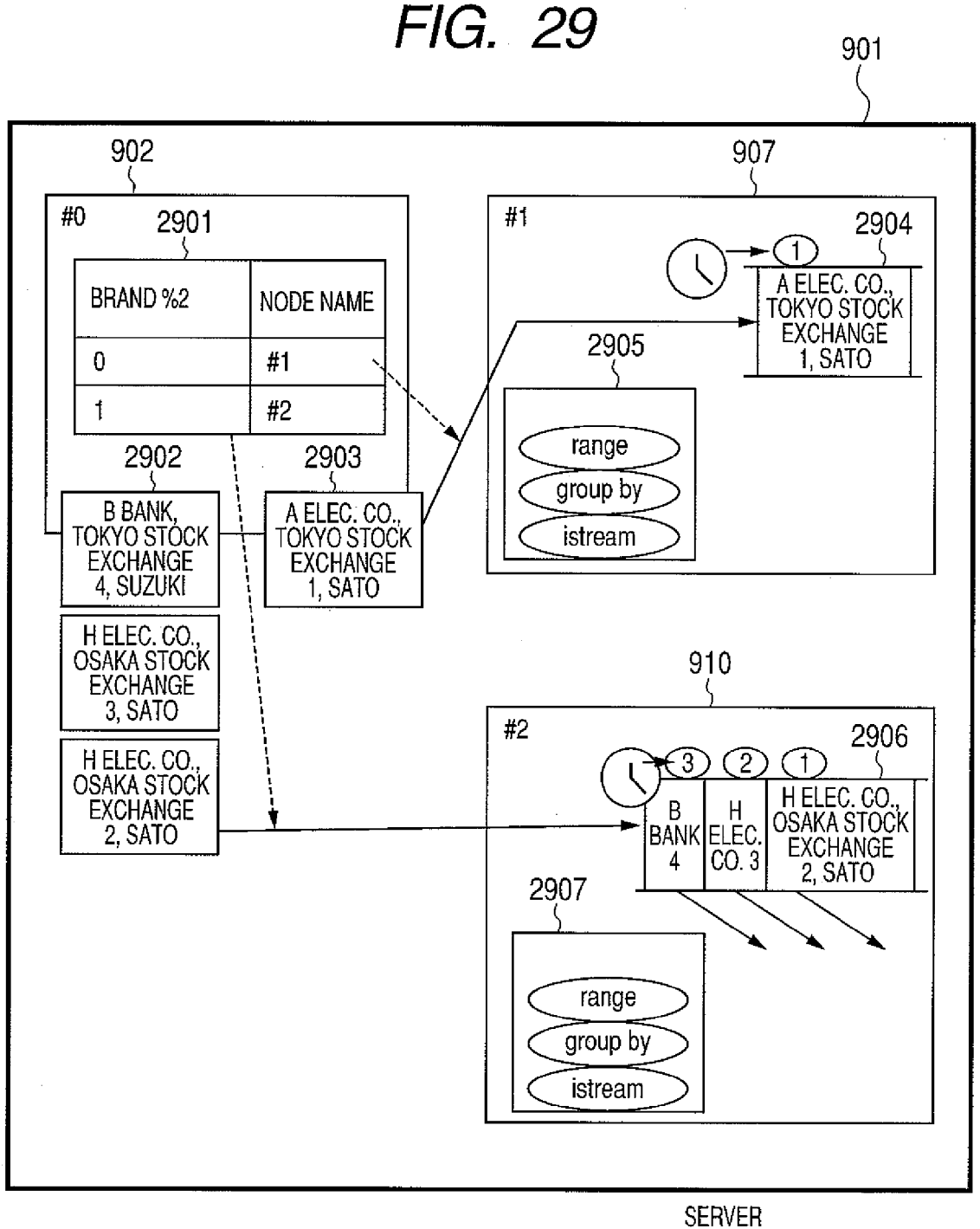
FIG. 29 is a drawing showing an operation example of query execution in a third embodiment.

FIG. 29 shows an example of the query execution that uses the query 301. The main node 902 uses the time stamp adding node reference table 2901 to distributes data (brand A Electric Company (2903)) having of brand % 2 of 0 and data (data (2902) brand B Bank, H Electric Company having brand % 2 of 1) to the output processing nodes #1 (907) and #2 (910), respectively (operation of 2706). The output processing nodes #1 and #2 add time stamps to the distributed data (2904, 2906) (operation of 2707), process operator trees 2905 and 2907 for the added data as in the first embodiment, and output the processed data to the output client.

In the third embodiment, the main node on the server distributes data to time stamp adding nodes. However, input data may be distributed in advance by a client, not by a server. Many clients of input destination may exist in stream data processing. In such a case, in comparison with distribution by the server, throughput can be increased without newly adding a node for distribution. Distribution operation by an input client will be described with reference to the flowchart of FIG. 30.

Figure 30:
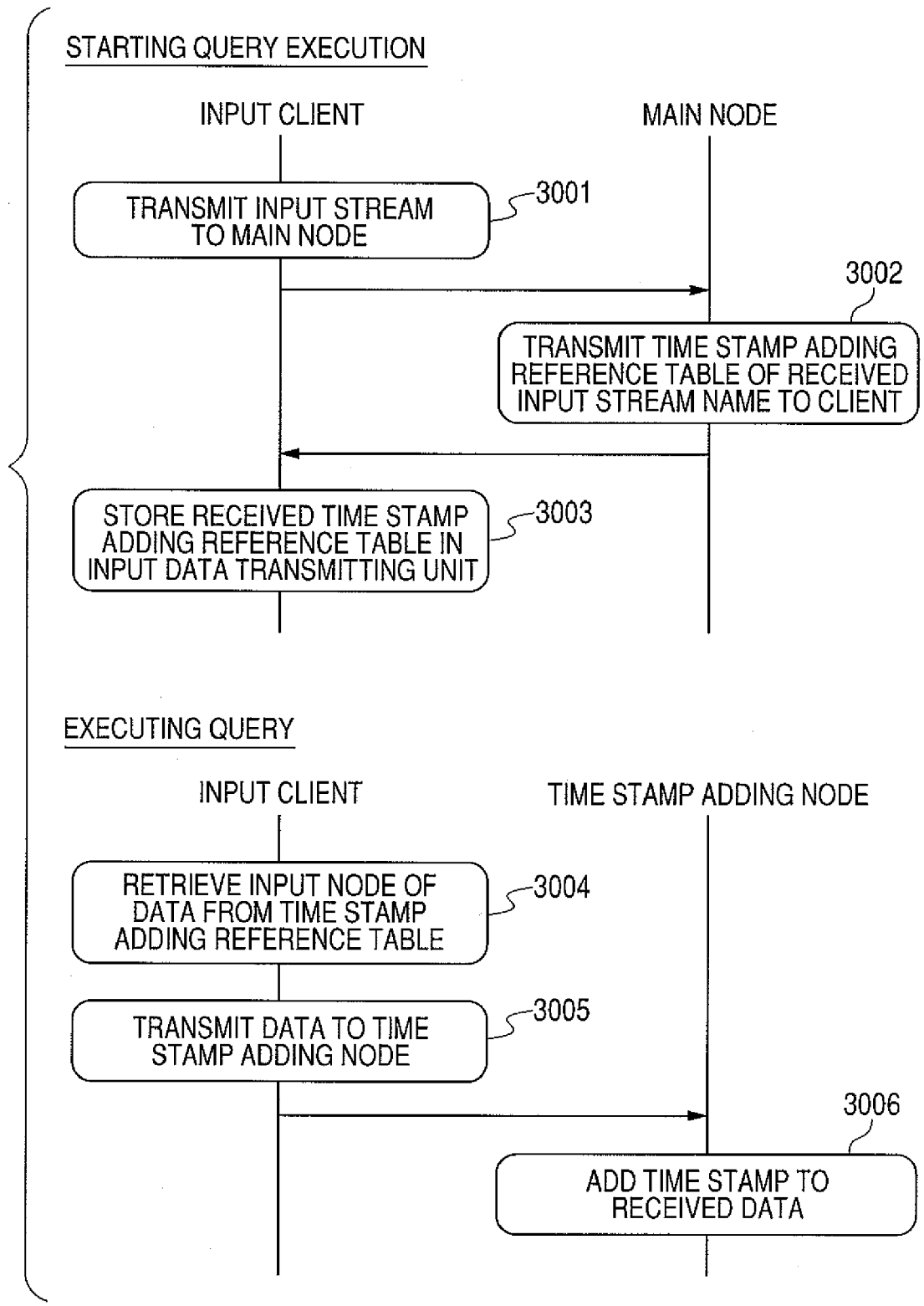
FIG. 30 is a flowchart of distribution processing by a client in a third embodiment.

The following describes the operation at the time of starting query execution shown in the upper portion of FIG. 30. In the main node, the time stamp adding node reference table is stored during query registration. An input client transmits an input stream name to the main node (3001). The main node transmits a time stamp adding node reference table corresponding to, the received input stream to the input client (3002). The input client stores the received time stamp adding node reference table in the input data transmitting unit (3003).

The following describes the operation of query execution shown in the lower portion of FIG. 30. An input client retrieves an input data distribution destination from the time stamp adding node reference table acquired during execution when inputting data (3004), and transmits the input data to each time stamp adding node (1005). The each time stamp adding node adds a time stamp to the received data. Subsequent operation follows the third embodiment.

Figure 31:
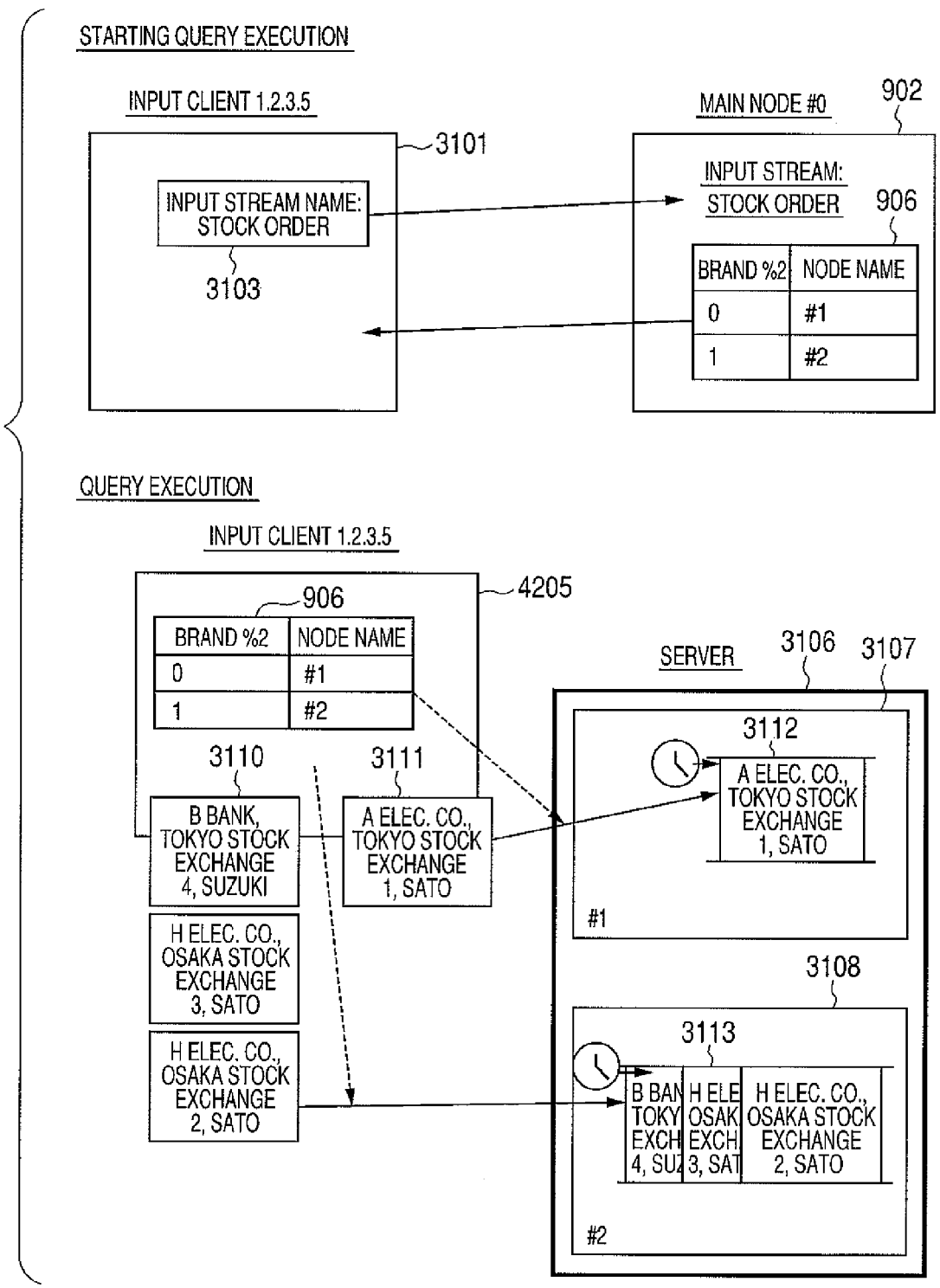
FIG. 31 is a drawing showing an operation example of distribution processing by a client in a third embodiment.

An example of the operation of an allocation method by an input client will be described using the query 301. FIG. 31 is a drawing showing operation examples during query execution start and during execution.

An operation example during query execution start in the upper portion of FIG. 31 will be described. An input client 1.2.3.5 (IP address) (3101) transfers an input stream name stock_order (3103) to the main node #0 (902) (operation of 3001). The main node #0 transfers the time stamp adding node reference table 906 corresponding to the stock_order to the input client 1.2.3.5 (operation of 3002). Specifically, data (3111) having brand % 2 of 0 is allocated to a node #1 (3107) to add a time stamp, and data (3110) having brand % 2 of 1 is allocated to a node #2 (3108) (operation of 3004 and 3005). The nodes #1 and #2 add time stamps to data (3112) having brand % 2 of 0 and data (3113) having brand % 2 of 1, respectively, and process operators (operation of 3006).

The present invention is effective as a technique for performing operator execution and output processing in plural nodes for each data in a stream data processing system.

What is claimed is:

1. A stream data processing method comprising the steps of:
   registering a query in a first node, subjecting data added with time stamps to operator execution in a second node set, and sorting the data having been subjected to operator execution according to the time stamps to output the data in a third node set;
   extracting, in the first node, a set of first value expressions indicating a group that assures an input order by data of the same group from the registered query, and calculating a set of second value expressions indicating a method for partitioning operator execution for each data in the plural second nodes;
   calculating a set of third value expressions indicating a method for performing output processing by partitioning data into the plural third nodes from the sets of the first and second value expressions, and determining a method for distributing data to the third node set from the set of third value expressions; and
   determining, on the basis of the distribution method for the third node set and the set of the first value expressions, a method for distributing data having been processed in the same second node so as to be processed in the same third node.

2. The stream data processing method according to claim 1, wherein the calculating the set of third value expressions comprises of the step of:
   defining, when any value expression F exists as an element in the sets of the first and second value expressions, the value expression F as an element in the set of third value expressions.

3. The stream data processing method according to claim 1, wherein the calculating the set of third value expressions comprises of the step of:
   defining, for any value expression F as an element of the set of first value expressions, and any value expression G as an element of the set of second value expressions, when it is shown that stream data having a same value as the value expression F always has a same value as the value expression G, an element in the set of third value expressions as the value expression G.

4. The stream data processing method according to claim 1, wherein the determining the method for distributing data to the third node set determines the method for distributing data to the third node set from the set of the third value expressions, the number of the second nodes, the number of the third nodes, and information about stream data; and wherein the method further comprising the step of analyzing and determining a method for distributing data of the second node set like the distribution method of the third node set, or a method for distributing data to more nodes than the third node set, on the basis of the distribution method for the third node set, the set of the first value expressions, the number of the second nodes, and information about stream data.

5. The stream data processing method according to claim 1, further comprising the steps of:

retrieving, in the first node or a client node, the third node set with referring to information about the data distribution method of the third node set;

sending data and information about the client to the third node set; and transferring, by the third node set, output data to the client, based on the data and the information about the client.

6. The stream data processing method according to claim 1, further comprising the step of:

adjusting, in the second node set or the third node set, output time for data to be outputted by using time stamp values of the data to be outputted and a permissible time lag width to confine the deviation of the order of inputted data within an indicated range when the permissible time lag width of an input order among the data to be outputted is presented from a client node.

7. The stream data processing method according to claim 1, further comprising the step of distributing data from the first node to plural time stamp adding nodes so that data to be processed in the same third node are subjected to time stamp adding processing in the same time stamp adding node.

8. A stream data processing system that processes inputted data comprising:

a first node for registering a query;

a second node set for performing operator execution of data to which a time stamp is added; and a third node set for sorting the data having been subjected to said operator execution according to the time stamp, and for outputting the data, wherein the first node extracts a set of first value expressions indicating a group that assures an input order by data of the same group from the registered query, and calculates a set of second value expressions indicating a method for partitioning operator execution for each data in the plural second nodes, wherein the first node calculates a set of third value expressions indicating a method for performing output processing by partitioning data into the plural third nodes from the sets of the first and second value expressions, and generates a first table indicating a method for distributing data to the third node set from the set of third value expressions, and wherein the first node generates a second table indicating a method for distributing data having been processed in the same second node so as to be processed in the same third node, from the distribution method for the third node set and the set of the first value expressions.

9. The stream data processing system according to claim 8, wherein the first node defines, when any value expression F exists as an element in the sets of the first and second value expressions, the value expression F as an element in the set of third value expressions.

10. The stream data processing system according to claim 8, Wherein the first node defines, for any value expression F as an element of the set of first value expressions, and any value expression G as an element of the set of second value expressions, when it is shown that stream data having the same value as the value expression F always has the same value as the value expression G, an element in the set of third value expressions as the value expression G.

11. The stream data processing system according to claim 8, wherein the first node generates the first table indicating a method for distributing data to the third node set from the set of the third value expression, the number of the second nodes, the number of the third nodes, and information about stream data, wherein the first node determines, from the distribution method in the third node set, the set of the first value expressions, the number of the second nodes, and information about stream data, a method for distributing data of the second node set like the distribution method of the third node set, or a method for distributing data to more nodes than the third node set, and wherein the first node generates the second table indicating the data distribution method of the second node set from the determined distribution method of the second node set.

12. The stream data processing system according to claim 8, wherein the first node retrieves the third node set from the first table, and sends data and information about a client node to the third node set, and wherein the third node set transfers data to the client node, based on the acquired information about the client node.

13. The stream data processing system according to claim 11, wherein the second node set or the third node set adjusts, when a permissible time lag width of an input order among data to be outputted is presented from a client node, output time of the data to be outputted by using time stamp values of the data to be outputted and the permissible time lag width to confine the deviation of the order of inputted data within an indicated range.

14. The stream data processing system according to claim 8, further comprising plural time stamp adding nodes, and Wherein the first node generates a table indicating a method for distributing the data to the plural time stamp adding nodes, the method being that data processed in the same third node to be processed in the same third node are subjected to time stamp adding processing in the same time stamp adding node.

* * * * *